United States Patent
Kishigami et al.

(10) Patent No.: US 8,654,871 B2
(45) Date of Patent: Feb. 18, 2014

(54) MULTICARRIER TRANSMITTER AND MULTICARRIER RECEIVER

(75) Inventors: Takaaki Kishigami, Tokyo (JP); Shozo Okasaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 590 days.

(21) Appl. No.: 12/682,231

(22) PCT Filed: Oct. 10, 2008

(86) PCT No.: PCT/JP2008/002883
§ 371 (c)(1),
(2), (4) Date: Apr. 8, 2010

(87) PCT Pub. No.: WO2009/047915
PCT Pub. Date: Apr. 16, 2009

(65) Prior Publication Data
US 2010/0246711 A1 Sep. 30, 2010

(30) Foreign Application Priority Data

Oct. 10, 2007 (JP) ................................. 2007-264828
Oct. 8, 2008 (JP) ................................. 2008-261969

(51) Int. Cl.
*H04K 1/10* (2006.01)
(52) U.S. Cl.
USPC ....................................................... 375/260
(58) Field of Classification Search
USPC ........... 375/260, 262, 265, 267; 370/208, 210
See application file for complete search history.

(56) References Cited

U.S. PATENT DOCUMENTS

| 5,440,585 A | 8/1995 | Partridge, III | |
|---|---|---|---|
| 2006/0045001 A1* | 3/2006 | Jalali | 370/208 |
| 2006/0256755 A1* | 11/2006 | Matsumoto et al. | 370/335 |
| 2008/0080432 A1* | 4/2008 | Lu et al. | 370/335 |
| 2008/0214126 A1* | 9/2008 | Holt | 455/93 |

(Continued)

FOREIGN PATENT DOCUMENTS

| JP | 07-099513 | 4/1995 |
|---|---|---|
| JP | 11-284595 | 10/1999 |

(Continued)

OTHER PUBLICATIONS

International Search Report dated Jan. 6, 2009.

(Continued)

*Primary Examiner* — Young T. Tse
(74) *Attorney, Agent, or Firm* — Dickinson Wright PLLC

(57) ABSTRACT

A multicarrier transmitter and a multicarrier receiver improve the reception characteristic of hierarchical modulation multiplex communication. A base station transmits a multicarrier superposition signal of a modulated signal addressed to a far user (a far-user addressed signal) and a modulated signal addressed to a near user (a near-user addressed signal) and modulated with a modulation multivalued number different from that of the far-user addressed signal. The base station separates the far-user addressed signal into frequency range signals, serial/parallel-transforms the near-user addressed signal to generate N1 parallel signals, and combines the generated N1 frequency components and the N1 parallel signals. Since the far-user receiver changes the near-user addressed signal into white noise by inverse discrete Fourier transform, the far-user receiver can demodulate the far-user addressed signal with high accuracy. The near-user receiver can acquire the signal addressed thereto with high accuracy by subtracting the far-user addressed signal from the received signal.

6 Claims, 20 Drawing Sheets

(56) References Cited

U.S. PATENT DOCUMENTS

| | | | |
|---|---|---|---|
| 2008/0304584 A1* | 12/2008 | Nishio et al. | 375/260 |
| 2009/0232194 A1* | 9/2009 | Yoshida | 375/227 |
| 2010/0104044 A1* | 4/2010 | Kishigami et al. | 375/299 |

FOREIGN PATENT DOCUMENTS

| | | |
|---|---|---|
| JP | 2005-286508 | 10/2005 |
| JP | 2006-287895 | 10/2006 |
| WO | 2006/011524 | 2/2006 |

OTHER PUBLICATIONS

K. Miyauchi, et al., "New Technique for Generating and Detecting Multilevel Signal Formats," IEEE Transactions on Communications, vol. 24, No. 2, Feb. 1976, pp. 263-267.

W. Miao, et al., "Superposition Coding Multiplexing for the Downlink of IEEE 802.16m," IEEE 802.16 Broadband Wireless Access Working Group: IEEE C802.16m-07/116, Jun. 2007, 5 pages.

* cited by examiner

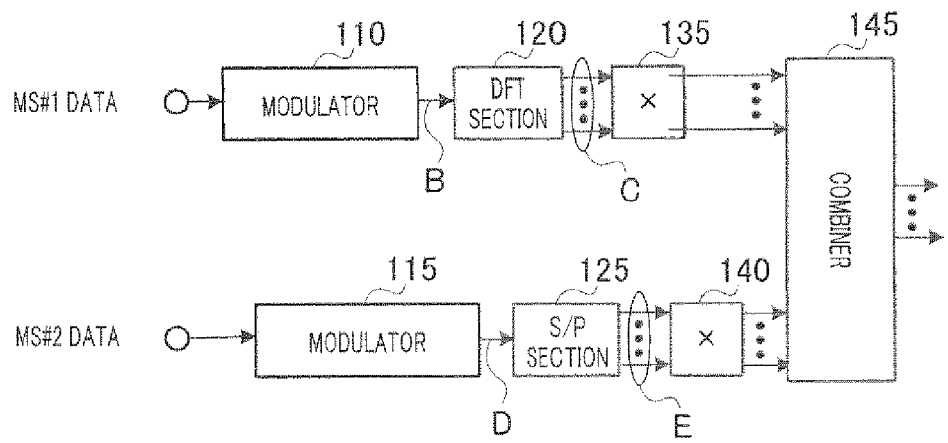
FIG.8A
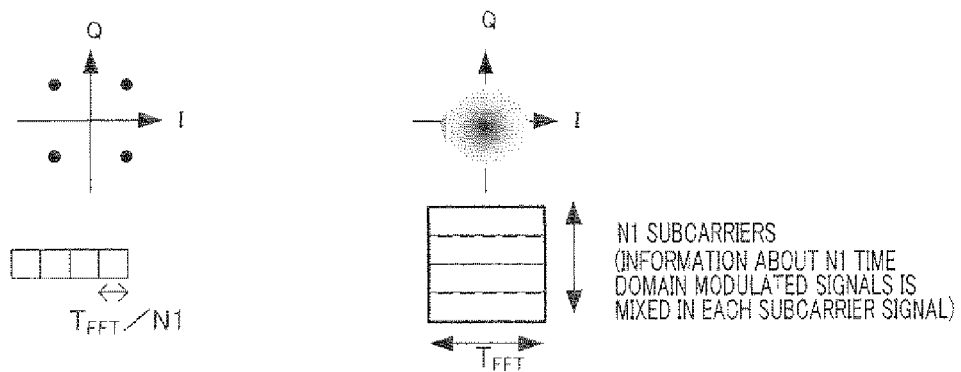
FIG.8B  FIG.8C
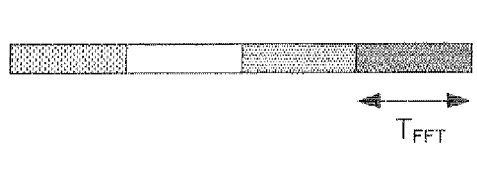  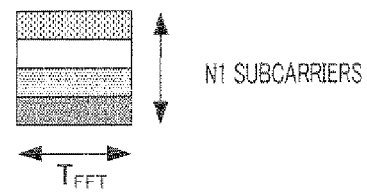
FIG.8D  FIG.8E

MULTICARRIER TRANSMITTER AND MULTICARRIER RECEIVER

TECHNICAL FIELD

The present invention relates to a multicarrier transmitting apparatus and a multicarrier receiving apparatus. More particularly, the present invention relates to a multicarrier transmitting apparatus and a multicarrier receiving apparatus that utilize a hierarchical modulation multiplexing technique (using SCM: Sub-Carrier Mapping) for multiplexing a plurality of signals modulated according to different M-ary modulation values.

BACKGROUND ART

Hierarchical modulation multiplexing (using SCM) is a technique for performing multiplexing transmission by hierarchizing modulated signals of different users. For example, Non-Patent Document 1 discloses this hierarchical modulation multiplexing transmission. This document discloses multiplexing and transmitting a modulated signal of high transmission power for a distant user (i.e. MS #1) and a modulated signal of low transmission power for a nearby user (i.e. MS #2) from a base station apparatus ("BS") (see FIG. 1). Note that, upon SCM, a user of a high transmission power coefficient is a "distant user," and a user of a low transmission power coefficient is a "nearby user."

As described above, with hierarchical modulation multiplexing transmission, there is a ratio of transmission power between a modulated signal for a distant user and a modulated signal for a nearby user (that is, the difference in transmission power of both), and therefore it is assumed that modulated signals for different users can be separated on the receiving side.

FIG. 2 shows a signal point constellation for a combined signal combining two modulated signals. Here, assume that transmission power coefficients for the distant user (i.e. MS #1) are $\alpha$, and transmission power coefficients for the nearby user (i.e. MS #2) are $\beta$. Further, the ratio of transmission power of both modulated signals is $\alpha^2:\beta^2=4:1$. The modulated signal for the distant user (i.e. MS #1) is modulated by QPSK, and the modulated signal for the nearby user (i.e. MS #2) is modulated by 16 QAM.

A combined signal is acquired by applying weights to modulated symbols (where the modulated symbol for the distant user is S1 and the modulated symbol for the nearby user is S2) addressed to both users according to the ratio of transmission power and adding the modulated symbols. That is, modulated signal S subjected to hierarchical modulation multiplexing is represented by $S=\alpha S1+\beta S2$.

The receiving side equalizes a channel fluctuation on the channel for the received signal, and then detects a signal point (i.e. symbol detection) based on the signal point constellation shown in FIG. 2.

As shown in FIG. 2, if $\alpha$ is greater than $\beta$, signal points in the signal point constellation for the combined signal do not overlap each other. Further, when the modulated symbol (i.e. S2) for the nearby user is focused upon, the minimum inter-signal point distance is the same in the case where S2 alone is transmitted and in the case where S2 is combined with S1 and transmitted.

By contrast with this, when a modulated symbol (i.e. S1) for the distant user is focused upon, the minimum inter-signal point distance is smaller in the case where S1 is combined with S2 and transmitted than in the case where S1 alone is transmitted. As a result, there is a possibility that receiving performance deteriorates. However, by making $\alpha$ substantially greater than $\beta$ ($\alpha\gg\beta$), it is possible to minimize the influence of deterioration of receiving performance.

In view of above, conventional hierarchical modulation multiplexing transmission (using SCM) allows the receiving side to detect only the desired symbol even if not only the desired symbol but also signals addressed to other users are included. That is, it is possible to assign extra transmission power to other users upon downlink transmission from a base station apparatus to terminal apparatuses, so that this contributes to increasing the number of users that can be accommodated and improving throughput of a wireless communication system.

Non-Patent Document 1: IEEE 802.16 Broadband Wireless Access Working Group, written contribution, IEEE C802.16m-07/116

DISCLOSURE OF INVENTION

Problems to be Solved by the Invention

However, if the above conventional hierarchical modulation multiplexing (using SCM) is used, received quality deteriorates as described below.

(1) Received Quality for Nearby User

Generally, a demodulation processer of a receiving apparatus has an A/D converter that performs A/D conversion of a received signal subjected to frequency transformation. Then, the demodulation processer performs digital signal processing using the signal subjected to A/D conversion.

The A/D converter quantizes an analogue received signal within a predetermined input range. Generally, when A/D conversion is performed, automatic gain control ("AGC") is performed to adjust the input level of a received signal to the input range of the A/D converter.

When SCM is used as described above, a nearby user receives a signal including a signal for a distant user transmitted by high transmission power. Therefore, automatic gain control is performed based on the signal for a distant user instead of the desired signal for the nearby user.

Therefore, if $\beta/\alpha$ becomes too small, quantization noise increases upon A/D conversion and received quality (i.e. SNR) for the nearby user decreases. For this reason, when the ratio of transmission power for the nearby user is great compared to transmission power for the distant user, receiving performance of the nearby user deteriorates.

(2) Received Quality for Distant User.

The distant user receives a signal to which a modulated signal for the nearby user is added as an interference signal component. When $\alpha$ is substantially greater than $\beta$ ($\alpha\gg\beta$), the distant user can ignore deterioration of received quality. However, if transmission power is set such that receiving performance of the above nearby user does not deteriorate, the minimum inter-signal point distance for the distant user becomes small compared to the case where the modulated signal (i.e. S1) alone is transmitted to the distant user by the same transmission power ($\alpha^2$), As a result, the receiving performance deteriorates. Note that the degree of deterioration due to the minimum distance can be calculated according to the following equation.

$$D=(\alpha-\beta)/\alpha$$

As described above, taking into account reception by the nearby user, smaller $\alpha/\beta$ is better. However, if $\alpha/\beta$ is made smaller, the receiving performance of the distant user deteriorates. That is, a conventional SCM system makes it difficult to make the state of receiving performance better for both the nearby user and distant user.

The present invention provides a multicarrier transmitting apparatus and multicarrier receiving apparatus that improve the receiving performance in hierarchical modulation multiplexing communication.

Means for Solving the Problem

The multicarrier transmitting apparatus according to the present invention employs a configuration of transmitting a multicarrier signal in which a second modulated signal is superimposed upon a plurality of discrete frequency domain components formed from a first modulated signal.

The multicarrier receiving apparatus according to the present invention employs a configuration which includes: a receiver that receives a multicarrier signal in which a second modulated signal is superimposed upon a plurality of discrete frequency domain components formed from a first modulated signal; and an extractor that extracts components matching the first modulated signal by performing an inverse Fourier transform of the multicarrier signal.

The multicarrier receiving apparatus according to the present invention employs a configuration which includes: a first reception processer that has: a receiver that receives a multiplexed signal in which a multicarrier signal in which a plurality of discrete frequency domain components formed with a first modulated signal are mapped on a subcarrier group, and a multicarrier signal in which parallel signals acquired from a second modulated signal are mapped on a subcarrier group are spatially-multiplexed; a parallel-to-serial converter that acquires a serial signal sequence by performing parallel-to-serial conversion of the multiplexed signal; and a demodulator/decoder that demodulates and decodes the serial signal sequence; and a second reception processer that has: a replica signal former that forms a replica signal of the second modulated signal based on a decoding result in the demodulator/decoder; an interference signal suppressor that subtracts the formed replica signal from the multiplexed signal; an inverse Fourier transformer that performs an inverse Fourier transform of the signal acquired in the interference signal suppressor; and a demodulator/decoder that demodulates and decodes the signal sequence acquired in the inverse Fourier transformer.

Advantageous Effects of Invention

According to the present invention, it is possible to provide a multicarrier transmitting apparatus and multicarrier receiving apparatus that improve the receiving performance in hierarchical modulation multiplexing communication.

BRIEF DESCRIPTION OF DRAWINGS

FIGS. 8A to 8E illustrates processing until a combined signal is formed in a base station apparatus of FIG. 3;

BEST MODE FOR CARRYING OUT THE INVENTION

Figure 1:
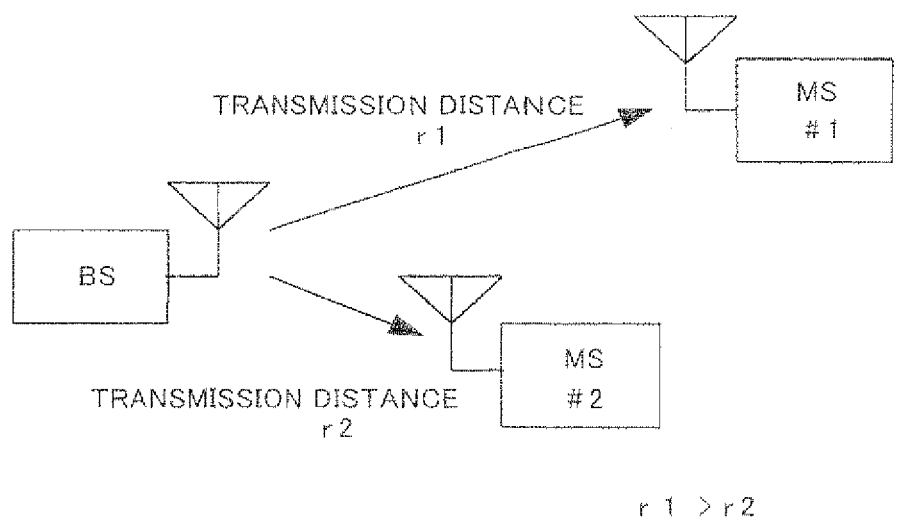
FIG. 1 illustrates conventional hierarchical modulation multiplexing (using SCM)
Figure 2:
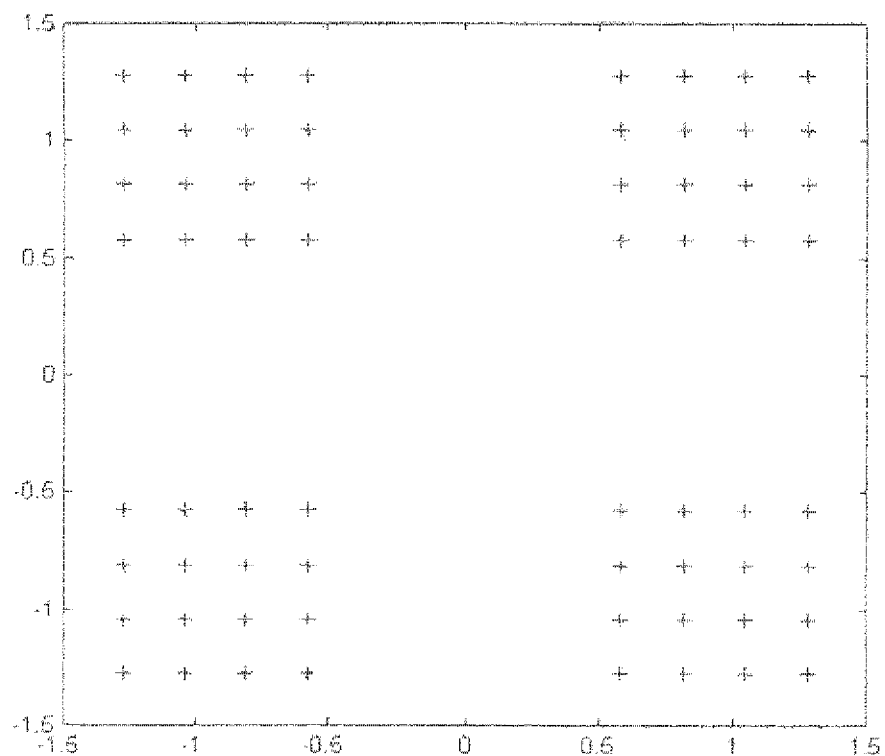
FIG. 2 illustrates conventional hierarchical modulation multiplexing (using SCM)

Hereinafter, embodiments of the present invention will be explained in detail with reference to the accompanying drawings. Note that the same components in the embodiments will be assigned the same reference numerals and explanation thereof will be omitted.

Embodiment 1

Figure 3:
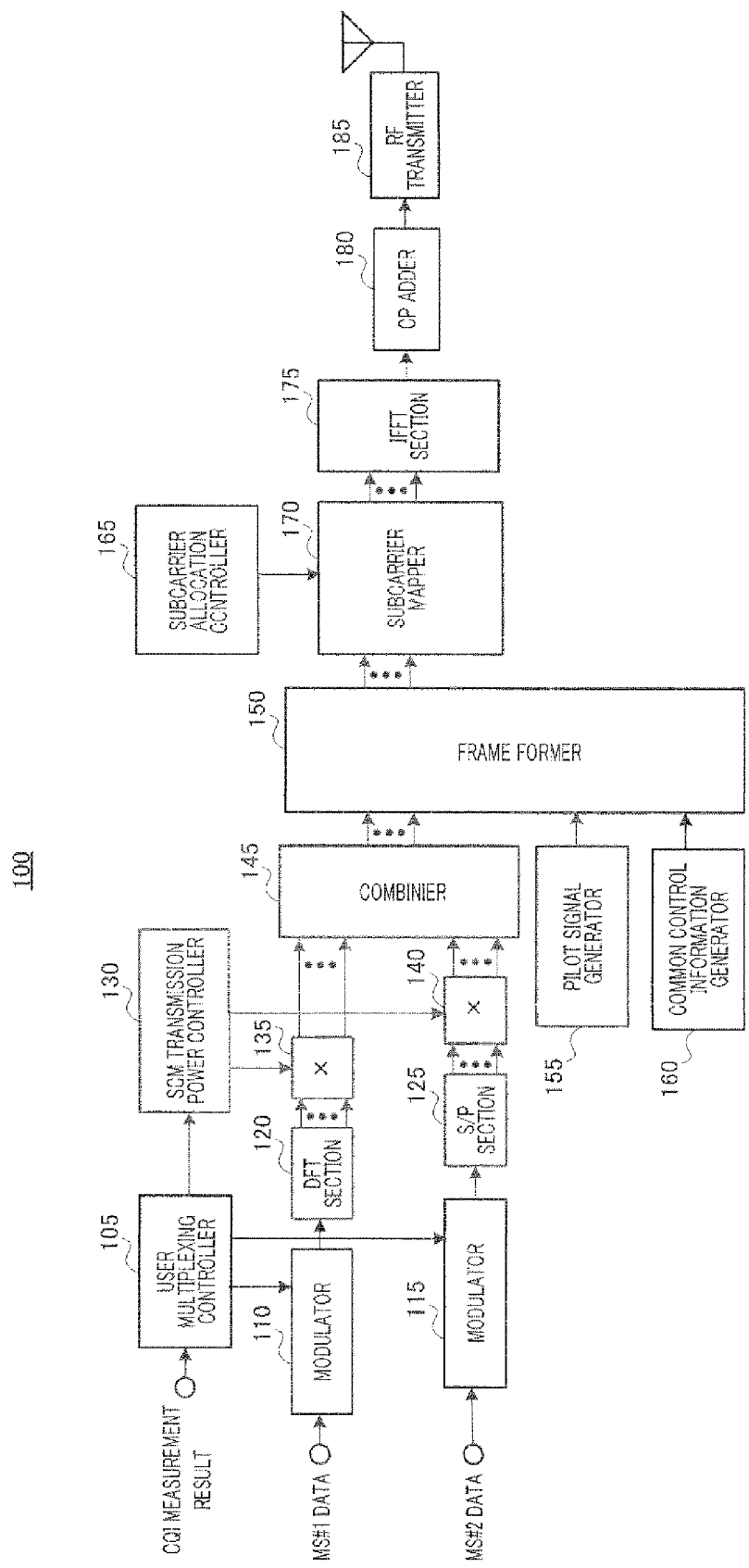
FIG. 3 is a block diagram showing a main configuration of a base station apparatus according to Embodiment 1 of the present invention.

As shown in FIG. 3, base station apparatus 100 that is a multicarrier transmitting apparatus according to the present embodiment has user multiplexing controller 105, modulator 110, modulator 115, DFT (Discrete Fourier Transform) section 120, S/P section 125, SCM transmission power controller 130, multiplier 135, multiplier 140, combiner 145, frame former 150, pilot signal generator 155, common control information generator 160, subcarrier allocation controller 165, subcarrier mapper 170, IFFT section 175, CP adder 180 and RF transmitter 185.

Further, FIG. 3 shows the configuration of base station apparatus 100 in case where OFDMA is applied. Hereinafter, a case will be explained where SCM transmission is performed using N1 subcarriers. Here, in case where N_FFT is assumed to be the FFT size in the IFFT (Inverse Fast Fourier Transform) section, the relationship N1≥N_FFT holds.

Based on CQI (Channel Quality Information) which is the measurement result of channel quality on the channel between base station apparatus 100 and the receiving side, user multiplexing controller 105 determines the M-ary modulation values to be applied to transmission data items that are addressed to terminal apparatuses (i.e. MS #1 and MS #2) and that are the target of multiplexing transmission, and outputs the determined M-ary modulation values to first modulator 110 and second modulator 115. User multiplexing controller 105 increases the orders of M-ary modulation values when channel quality is better.

The measurement result of channel quality used to determine this M-ary modulation value may be a result that is measured by a terminal apparatus based on a signal transmitted from base station apparatus 100 and that is fed back to base station apparatus 100, or a result that is measured by base station apparatus 100 based on a transmission signal from the terminal apparatus.

First modulator 110 and second modulator 115 modulate transmission data bits (for example, bit sequences subjected to error correction coding, puncturing and interleaving) for terminal apparatuses, based on the M-ary modulation values determined in user multiplexing controller 105. First modulator 110 and second modulator 115 generate modulated signals by mapping bit sequences received as input, on modulated symbols. Here, transmission data includes user-specific data signals and user-specific control signals.

DFT (Discrete Fourier transform) section 120 divides an output signal of first modulator 110, into a plurality of frequency components on a per symbol basis. When N1 subcarriers are allocated to first modulator 110, the DFT (Discrete Fourier Transform) section performs DFT processing assuming N1 items of modulated symbol data outputted from first modulator 110 as one block. That is, DFT section 120 transforms N1 items of modulated symbol data in the frequency domain, and outputs N1 signals of different frequencies (hereinafter, each of these signals is also referred to as an "output subcarrier" of DFT section 120).

S/P section 125 forms a plurality of parallel signals by performing serial-to-parallel conversion of the output signal of second modulator 115. When N1 subcarriers are allocated to second modulator 115, S/P section 125 performs serial-to-parallel conversion processing assuming N1 items of modulated symbol data (which are serial data) as one block. S/P section 125 outputs N1 parallel signals resulting from serial-to-parallel conversion (hereinafter, each of these signals is also referred to as an "output subcarrier" of S/P section 125).

SCM transmission power controller 130 outputs to multiplier 135 and multiplier 140 power control coefficients α and β used to control the transmission power of the output signals of DFT section 120 and the output signals of S/P section 125.

With the present embodiment, a modulated signal that is addressed to a terminal apparatus (i.e. a nearby user) close to base station apparatus 100 is processed in S/P section 125, and a modulated signal that is addressed to a terminal apparatus (i.e. a distant user) farther from base station apparatus 100 than the terminal apparatus (i.e. the nearby user) is processed in DFT section 120. Therefore, α multiplied with the output signals of DFT section 120 by multiplier 135 is greater than β multiplied with the output signals of S/P section 125 by multiplier 140.

Further, SCM transmission power controller 130 limits the transmission power offset range between power control coefficients α and β to suppress the influence of quantization error upon receiving performance of the nearby user as described above. To be more specific, power control coefficients α and β are determined to satisfy the following condition.

Identifiable condition of SCM: $\alpha/\beta > 2$

Condition in which no influence of quantization error is produced:

$$D > (\beta/(\alpha+\beta))$$

D=around 6 to 12 dB

Further, by preparing a plurality of sets of (α and β) in advance, assigning an index to each set and listing each set in a table, SCM transmission power controller 130 reports index information matching the determined set of power control coefficients to multipliers 135 and 140. By this means, it is possible to reduce the amount of signaling.

Multiplier 135 multiplies the output signals of DFT section 120 with transmission power coefficient α. As described above, the output signals of DFT section 120 are formed with N1 frequency components. Therefore, multiplier 135 multiplies each of N1 frequency components with transmission power coefficient α.

Multiplier 140 multiplies the output signals of S/P section 125 with transmission power coefficient β. As described above, the output signals of S/P section 125 are formed with N1 parallel signals. Therefore, multiplier 140 multiplies each of N1 parallel signals with transmission power coefficient β.

Combiner 145 superimposes signals obtained after multiplying output subcarriers D_SC(k) of DFT section 120 with transmission power coefficient α, and signals obtained after multiplying output subcarriers S_SC(k) of S/P section 125 with transmission power coefficient β. To be more specific, a combined signal is determined based on $\alpha D\_SC(k)+\beta S\_SC(k)$. Here, k=1~N1 holds. Note that processings in modulator 110 and in modulator 115 to combiner 145 will be described later in detail when their operations will be explained.

Frame former 150 receives as input the combined signal outputted from combiner 145, the pilot signal outputted from pilot signal generator 155 and the common control signal outputted from common control information generator 160. Then, frame former 150 forms a frame using the combined signal, pilot signal and common control signal. In this frame, for example, the combined signal, pilot signal and common control signal are arranged in different time intervals. That is, the combined signal, pilot signal and common control signal are transmitted by TDD (Time Division Duplex).

Figure 4A:
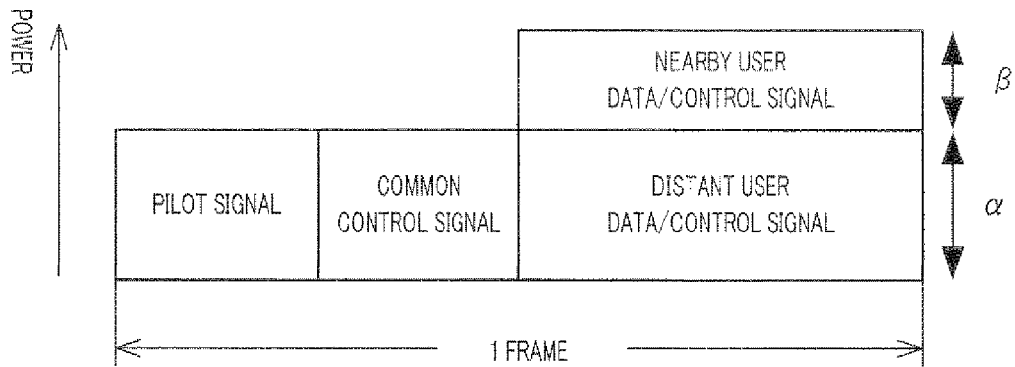
FIGS. 4A to 4C shows an allocation of a combined signal, pilot signal and common control signal in a frame transmitted from the base station apparatus of FIG. 3, and the relationship of transmission power of those signals.
Figure 4B:
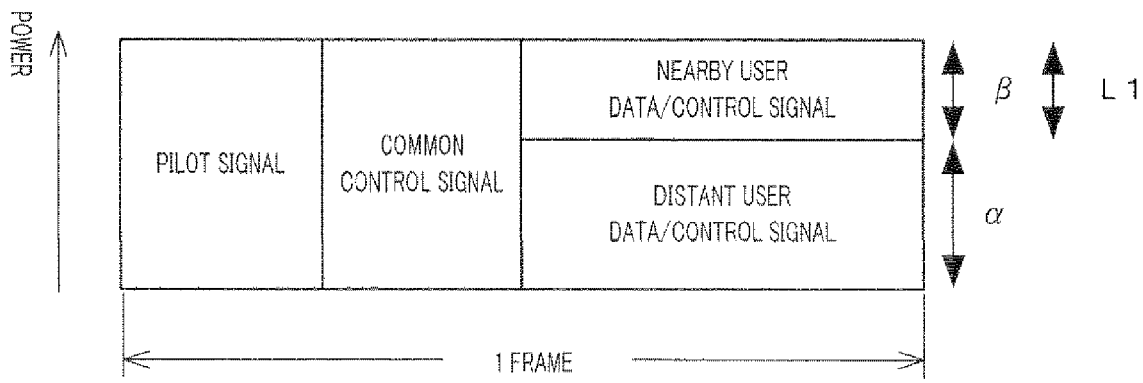
Figure 4C:
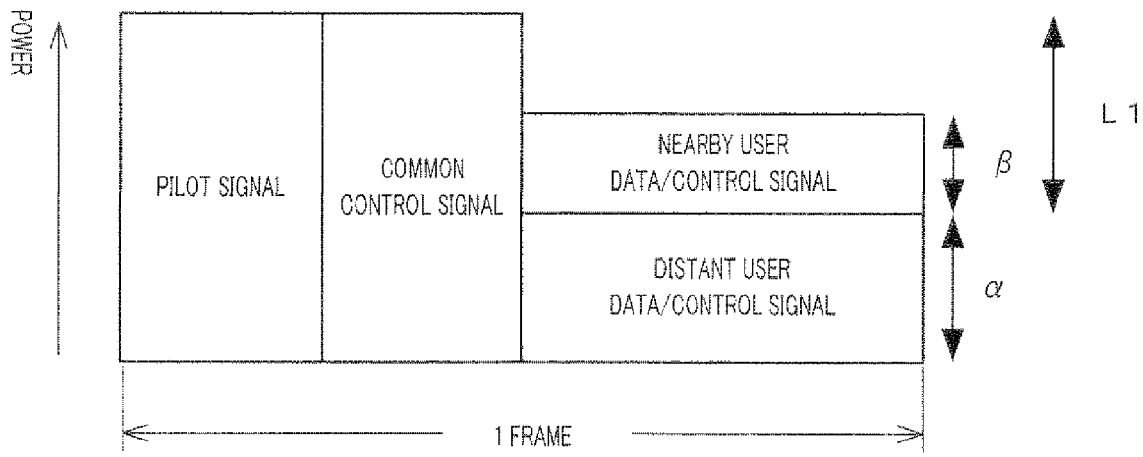

FIGS. 4A to 4C shows an allocation of the combined signal, pilot signal and common control signal in the frame, and the relationship of transmission power between these signals. Further, although the combined signal, pilot signal and common control signal are multiplexed by TDM (Time Division Multiplexing) in FIGS. 4A to 4C, the above signals may be transmitted by FDM or by combining FDM with TDM.

In the frame shown in FIG. 4A, the transmission power of the pilot signal and common control signal matches the transmission power of the signal transmitted to the distant user. That is, the transmission power of the pilot signal and common control signal is controlled using transmission power coefficient α multiplied upon the signal transmitted to the distant user. In this case, the distant user can estimate a channel (hereinafter, "channel estimation") based on the pilot signal, and perform demodulation processing using this channel estimation result as is.

Further, in this case, transmission power of the pilot signal differs from transmission power of the signal transmitted to the nearby user, and therefore the difference (for example, β/α) in transmission power between these signals needs to be reported to the nearby user. That is, the channel estimation value acquired by using the pilot signal which is subjected to transmission power control based on transmission power coefficient α, needs to be adjusted to match a signal which is addressed to the nearby user and which is subjected to transmission power control based on transmission power coefficient β.

Therefore, information related to the difference (for example, β/α) in transmission power is included in the common control signal and transmitted. Note that information that the receiving side needs to process signals transmitted by SCM, such as information related to the difference in transmission power (for example, β/α), will also be referred to as "SCM information" below.

In the frame shown in FIG. 4B, the transmission power of the pilot signal, common control signal and combined signal (a signal combining the signal addressed to the nearby user and the signal addressed to the distant user) matches. That is, the transmission power of the pilot signal and common control signal is controlled using transmission power coefficient α and transmission power coefficient β. In this case, the transmission power for the distant user and the nearby user differs from transmission power of the pilot signal.

Therefore, the difference in transmission power (for example, β/α and L1) needs to be reported to both the nearby user and the distant user. Information related to the difference in transmission power (for example, β/α and L1) is included in the common control signal and transmitted. Note that L1 is the ratio of α to the transmission power of the pilot signal.

In the frame shown in FIG. 4C, the transmission power of the pilot signal and common control signal is greater than the transmission power of the combined signal (i.e. the signal combining the signal addressed to the nearby user and the signal addressed to the distant user). In this case, the difference in transmission power (for example, β/α and L1) needs to be reported to both the nearby user and the distant user. Note that the signal addressed to the nearby user and the signal addressed to the distant user can include user-specific pilot signals and user-specific control signals.

Figure 5A:
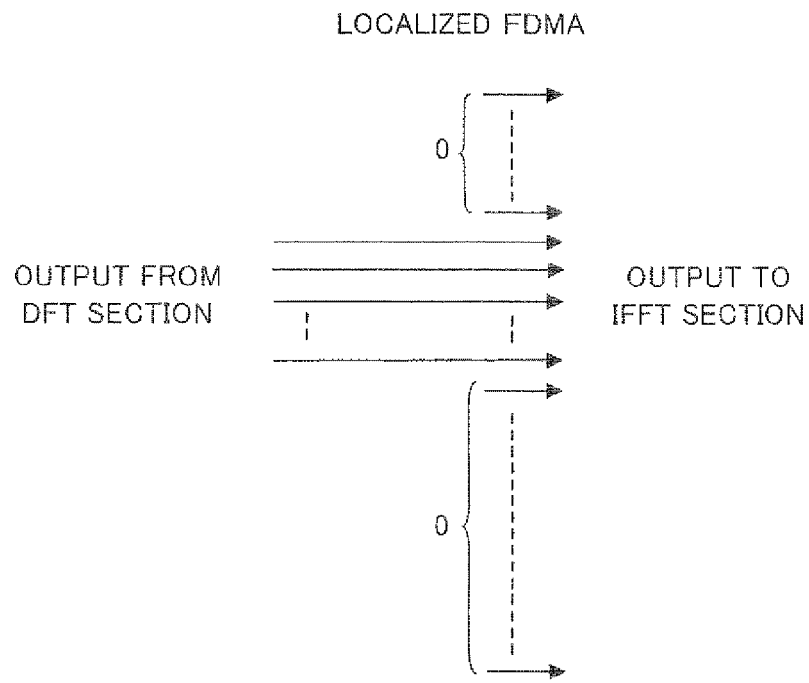
FIGS. 5A and 5B illustrates a method of allocating subcarriers.
Figure 5B:
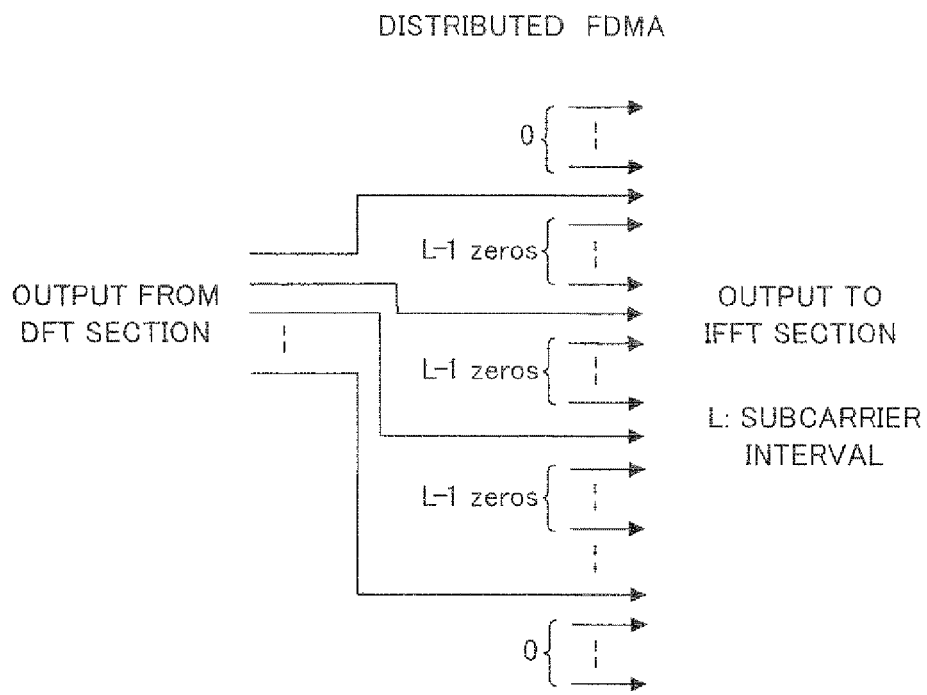

Subcarrier allocation controller 165 allocates subcarriers that are used to transmit the frame formed in frame former 150. That is, subcarrier allocation controller 165 determines subcarriers utilized to transmit the frame formed in frame former 150, and outputs information related to the determined subcarriers, to subcarrier mapper 170. For the method of allocating subcarriers, as shown in FIGS. 5A and 5B, a (localized allocation) method of allocating consecutive subcarriers or a (distributed allocation) method of using subcarriers of equal intervals is used.

Subcarrier mapper 170 arranges the frame including the combined signal outputted from combiner 145, on applicable subcarriers, based on control information from subcarrier allocation controller 165, and outputs the result to IFFT section 175.

IFFT section 175 forms an OFDM signal by performing IFFT processing based on the size of N_FFT. CP adder 180 adds a CP (Cyclic Prefix) to the OFDM signal acquired in IFFT section 175. RF transmitter 185 performs predetermined radio transmission processing of the OFDM signal to which a CP is added, and transmits the OFDM signal through the antenna.

Embodiment 2

Figure 6:
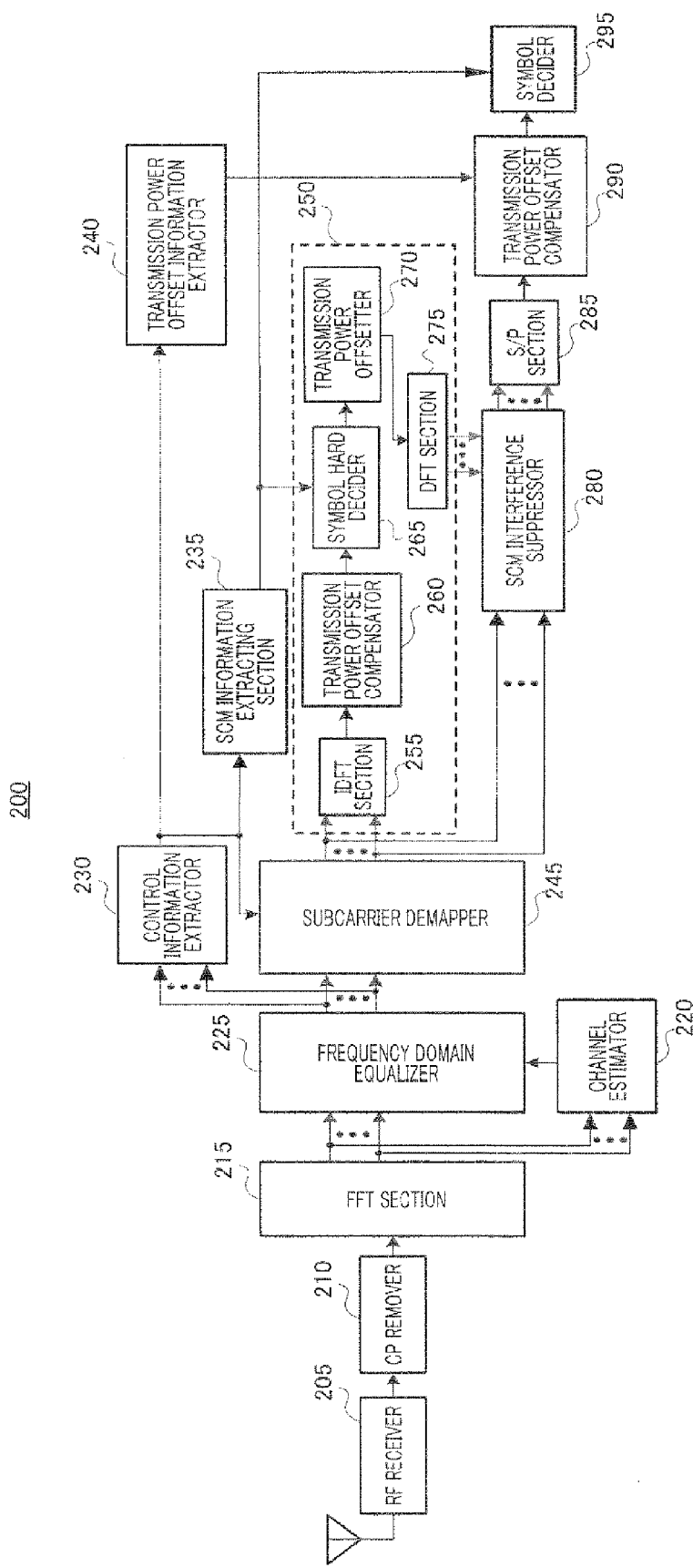
FIG. 6 is a block diagram showing a main configuration of a terminal apparatus (of a nearby user) according to Embodiment 2.

As shown in FIG. 6, terminal apparatus 200 that is a multicarrier signal receiving apparatus according to the present embodiment has RF receiver 205, CP remover 210, FFT section 215, channel estimator 220, frequency domain equalizer 225, control information extractor 230, SCM information extractor 235, subcarrier demapper 245, interference signal extractor 250, SCM interference suppressor 280, P/S section 285, transmission power offset information extractor 240, transmission power offset compensator 290, and symbol decider 295.

Interference signal extractor 250 has IDFT section 255, transmission power offset compensator 260, symbol hard decider 265, transmission power offsetter 270 and DFT section 275. Particularly, FIG. 6 shows a configuration of terminal apparatus 200 that is the nearby user located close to base station apparatus 100.

The signal transmitted from base station apparatus 100 is subjected to predetermined radio reception processing in RF receiver 205, and the CP is removed from the signal in CP remover 210. Then, the received OFDM signal after CP removal is transformed into frequency domain signals in FFT section 215.

Channel estimator 220 calculates a channel estimation value using the pilot signal included in the output signals of FFT section 215. Channel estimator 220 calculates a channel estimation value on a per subcarrier basis.

Frequency domain equalizer 225 performs frequency domain equalization of subcarrier signals outputted from FFT section 215 using the channel estimation value of each subcarrier. The ZF criterion or MMSE criterion is used in this frequency domain equalization. The subcarrier signals subjected to frequency domain equalization processing are outputted to control information extractor 230 and subcarrier demapper 245.

Control information extractor 230 restores common control information by applying demodulation and decoding processing to the portion corresponding to the common control signal in the output signals of frequency domain equalizer 225. This common control signal is processed according to a modulation scheme and encoding scheme that are known in advance in base station apparatus 100 of the transmitting side, and is transmitted. Further, this common control signal is transmitted by the same transmission power as the pilot signal shown in FIG. 4.

SCM information extractor 235 extracts SCM information (MCS (Modulation Coding Scheme) information about the distant user and nearby user) included in the common control information.

Transmission power offset information extractor 240 extracts transmission power offset information (information related to the transmission power ratios of the signal addressed to the distant user, the signal addressed to the nearby user and the pilot signal, that is, information related to the difference in the above transmission power) included in the common control information. This extracted information is outputted to transmission power offset compensator 290.

Further, if base station apparatus 100 of the transmitting side stores a table which includes information about the transmission power ratios in the item of the table of MCS sets and reports index information matching the MCS sets to terminal apparatus 200, transmission power offset information extractor 240 extracts this index information. By utilizing index information for a notice, it is possible to reduce the amount of traffic between base station apparatus 100 and terminal apparatus 200. Then, transmission power offset information extractor 240 specifies information about the transmission power ratios matching the extracted index information, from the above table stored in terminal apparatus 200, and outputs the specified information to transmission power offset compensator 290.

Based on frequency resource allocation information included in the common control information extracted in control information extractor 230, subcarrier demapper 245 outputs a subcarrier group allocated to the signal addressed to terminal apparatus 200, to interference signal extractor 250. With the present embodiment, the signal addressed to the nearby user is transmitted using N1 parallel signals, and therefore that subcarrier group is formed with N1 parallel signals. Further, with Embodiments 1 and 2, frequency components into which the signal addressed to the distant user is divided are superimposed on N1 parallel signals.

Interference signal extractor 250 extracts the signal which is addressed to the distant user and which is an interference signal for mobile terminal 200, from the output signals of subcarrier demapper 245. As described above, in the transmission signal from base station apparatus 100 of the transmitting side, a modulated signal addressed to the nearby user is superimposed as is as a time domain signal on a plurality of frequency components into which the modulated signal addressed to the distant user is divided in the frequency domain on a per symbol basis. That is, in the output signals from subcarrier demapper 245, the modulated signal addressed to the nearby user is superimposed as is as a time domain signal on a plurality of frequency components into which the modulated signal addressed to the distant user is divided in the frequency domain on a per symbol basis.

To be more specific, IDFT section 255 of interference signal extractor 250 performs transformation from the frequency domain into the time domain by performing IDFT processing of N1 parallel signals received from subcarrier demapper 245 based on the size of N1.

If there is a power difference (i.e. offset) between the transmission power of the pilot signal and the transmission power of the signal addressed to the distant user, transmission power offset compensator 260 compensates for the power difference for the time domain signal acquired in IDFT section 255. That is, if there is a ratio of a transmission amplitude (L1) of the signal addressed to the distant user, with respect to the pilot signal, transmission power offset compensator 260 outputs the signal obtained by multiplying the input signal with 1/L1.

Symbol hard decider 265 performs modulated symbol decision detection with respect to the signal received from IDFT section 255 through transmission power offset compensator 260. This modulated symbol decision detection is performed based on information from SCM information extractor 235. That is, the M-ary modulation value applied to the signal that is addressed to the distant user and that is an interference signal for the nearby user, is specified based on information extracted in SCM information extractor 235, and symbol hard decider 265 performs modulated symbol decision matching the modulation scheme applied to the signal addressed to the distant user.

Transmission power offsetter 270 performs the reverse operation of transmission power offset compensator 260. If there is a power difference (i.e. offset) between the transmission power of the pilot signal and the transmission power of the signal addressed to the distant user, transmission power offsetter 270 compensates for the power difference for the output signal of symbol hard decider 265. That is, if there is the ratio of a transmission amplitude (L1) of the signal addressed to the distant user, with respect to the pilot signal, the signal acquired by multiplying the input signal with L1 is outputted.

DFT section 275 performs DFT processing of the decision result in symbol hard decider 265, assuming as a processing unit the decision results matching N1 parallel signals which are the target of IDFT processing in IDFT section 255. The signals after DFT processing are a signal which is addressed to the distant user and which is an interference signal for terminal apparatus 200 of the nearby user, and, to be more specific, are formed with N1 frequency components into which the signal addressed to the distant user is divided on a per symbol basis.

SCM interference suppressor 280 subtracts from the N1 parallel signals outputted from subcarrier demapper 245 the signal addressed to the distant user and extracted in interference signal extractor 250 from the N1 parallel signals. This subtraction processing is performed between parallel signals and frequency components matching the parallel signals. By so doing, it is possible to cancel the signal which is addressed to the distant user and which is superimposed upon a signal addressed to terminal apparatus 200 of the nearby user.

S/P section 285 forms a serial signal by performing parallel-to-serial conversion of N1 parallel signals from which the interference signal is canceled in SCM interference suppressor 280.

Transmission offset compensator 290 performs offset compensation for the signals from which the interference signal is canceled in SCM interference suppressor 280 based on transmission power offset information extracted in transmission power offset information extractor 240.

This offset compensation processing is performed to allow adequate symbol decision for the modulated signal addressed to the nearby user even in a situation where the pilot signal for channel estimation is transmitted using different transmission power from the transmission power of the signal addressed to the nearby user. With this offset compensation processing, the input level of symbol decider 295 is normalized at the transmission level at which the signal addressed to the nearby user is transmitted from base station apparatus 100.

To be more specific, if there is the ratio of a transmission amplitude (L2) of the signal addressed to the nearby user, with respect to the pilot signal, transmission power offset compensator 290 outputs a signal acquired by multiplying the input signal with 1/L2. The offset of a signal level of the nearby user in the amplitude direction is compensated in this way to perform symbol decision adequately in subsequent symbol decider 295.

Symbol decider 295 performs symbol decision of modulated symbols outputted from transmission power offset compensator 290. This symbol decision result is subjected to processing such as deinterleaving, depuncturing and error correction decoding, and is restored as transmission data.

Figure 7:
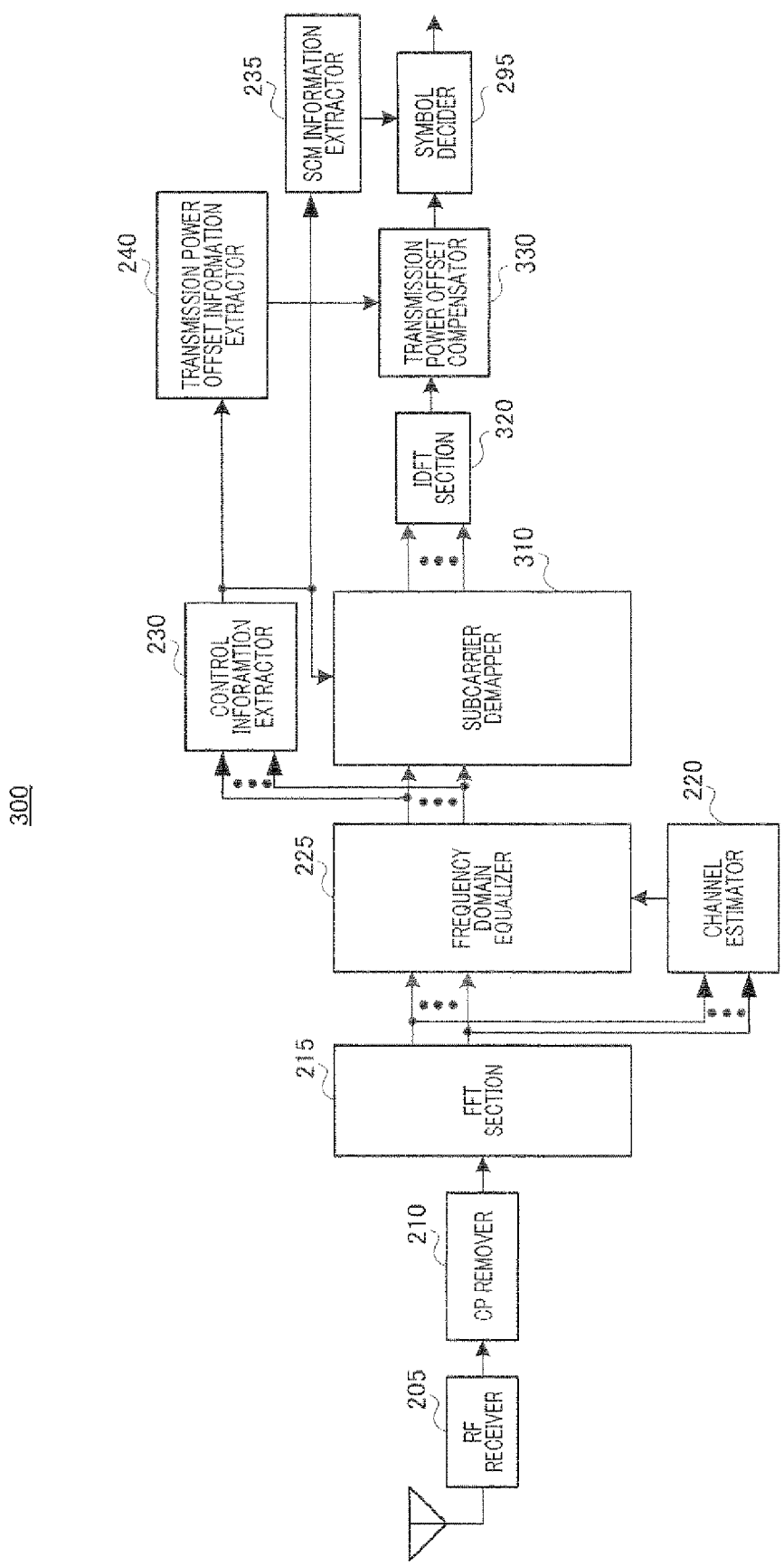
FIG. 7 is a block diagram showing a main configuration of a terminal apparatus (of a distant user) according to Embodiment 2.

As shown in FIG. 7, terminal apparatus 300 that is a multicarrier signal receiving apparatus according to the present embodiment has subcarrier demapper 310, IDFT section 320 and transmission power offset compensator 330. Particularly, FIG. 7 shows a configuration of terminal apparatus 300 that is a distant user located far from base station apparatus 100.

Based on frequency resource allocation information included in the common control information extracted in control information extractor 230, subcarrier demapper 310 outputs to IDFT section 320 a subcarrier group allocated to the signal for terminal apparatus 300. With Embodiments 1 and 2, the signal addressed to the distant user are divided into N1 frequency components and transmitted, and therefore its subcarrier group is formed with N1 parallel signals including N1 frequency components. Further, with Embodiments 1 and 2, the signal addressed to the nearby user is superimposed as is as a time domain signal, upon. N1 parallel signals.

IDFT section 320 performs transformation from the frequency domain into the time domain by performing IDFT processing of N1 parallel signals received from subcarrier demapper 310, based on the size of N1.

If there is the power difference (i.e. offset) between the transmission power of the pilot signal and the transmission power of the signal addressed to the distant user, transmission power offset compensator 330 compensates for the power difference for the time domain signal acquired in IDFT section 320. That is, if there is the ratio of a transmission amplitude (L1) of the signal addressed to the distant user, with respect to the pilot signal, transmission power offset compensator 330 outputs a signal acquired by multiplying the input signal with 1/L1.

Next, the operations of base station apparatus 100, terminal apparatus 200 and terminal apparatus 300 having the above configurations will be explained.

In base station apparatus 100, modulator 110 modulates data addressed to the distant user, and outputs a modulated signal (corresponding to signal B shown in FIG. 8A). Generally, channel quality for the distant user is not good, and therefore a low M-ary modulation value such as QPSK is used as shown in FIG. 8B. In the lower part of FIG. 8B, a modulated signal (corresponding to signal B) formed with a symbol sequence is shown. Here, one symbol has a time length of $T_{FFT}/N1$.

The modulated signal (corresponding to signal B) is divided in DFT section 120 into N1 frequency components on a per symbol basis. In this case, each symbol is subjected to DFT processing in DFT section 120, and therefore, in case where a signal transformed into a plurality of (N1) discrete frequency domain components is observed on an IQ plane, apart from the time domain modulated signal (corresponding to signal B), this signal shows a distribution that is statistically similar to Gaussian distribution, instead of showing a distinct signal point constellation.

In FIG. 8C, the vertical axis direction indicates the frequency direction. Note that each rectangular piled up in the vertical axis direction indicates each frequency component (which is referred to as "subcarrier" in FIG. 8C). Further, DFT section 120 performs DFT processing assuming N1 items of modulated symbol data as one block, and therefore frequency components acquired from N1 symbols are mixed in the rectangulars.

Furthermore, in base station apparatus 100, modulator 115 modulates data addressed to the nearby user and outputs a modulated signal (corresponding to signal D). Generally, channel quality for a nearby user is better than channel quality for a distant user, and a higher M-ary modulation value is applied to the signal addressed to a distant user than the M-ary modulation value applied to the signal addressed to a nearby user. FIG. 8D shows a modulated signal (corresponding to signal D), and one symbol has a time length of $T_{FFT}$.

S/P section 125 performs serial-to-parallel conversion of the modulated signal (corresponding to signal D) assuming N1 items of modulated symbol data as one block, and forms N1 parallel signals (corresponding to signals E) (see FIG. 8E).

The N1 frequency components (corresponding to signals C) and N1 parallel signals (corresponding to signals E) are multiplied with transmission power coefficients in multiplier 135 and multiplier 140, respectively, and then combined in combiner 145.

That is, in a multicarrier signal formed in combiner 145, the first frequency component in frequency components acquired by dividing the first modulated symbol data sequence (modulated symbol data sequence addressed to the distant user) in the frequency domain, and one symbol in the second modulated symbol data sequence (modulated symbol data sequence addressed to the nearby user) are superimposed on the first subcarrier. Further, the second frequency component that is different from the first frequency component in the frequency components acquired by dividing the first modulated symbol sequence in the frequency domain, and another symbol in the second modulated symbol sequence that is different from the above one symbol in the time domain, are superimposed on the second subcarrier.

In this way, base station apparatus 100 transforms one of two modulated signals transmitted using the hierarchical modulation multiplexing scheme (using SCM) into a frequency domain signal, and combines this signal with the other signal, so that it is possible to reduce PAPR of the resulting OFDM signal compared to conventional SCM for combining time domain modulated signals. As a result, it is possible to increase transmission power of the signal addressed to the distant user.

Then, a signal transmitted from base station apparatus 100 is subjected to reception processing in terminal apparatus 200 and terminal apparatus 300.

Terminal apparatus 200 cancels the signal addressed to terminal apparatus 300 of the distant user, from the received signal, and performs decoding processing of the signal in symbol decider 295.

To be more specific, interference signal extractor 250 receives signals matching the combined signal combined in combiner 145 of base station apparatus 100, from subcarrier demapper 245. Then, IDFT section 255 of interference signal extractor 250 performs IDFT processing of the signals received from subcarrier demapper 245 to transform the signals matching signals C (corresponding to the signal addressed to the distant user) included in the received signals, into time domain signals.

By contrast with this, the signals matching signals E (corresponding to the signal addressed to the nearby user) and included in the signals received from subcarrier demapper 245 are transmitted as is as time domain signals, and therefore are transformed into frequency domain signals. That is, the signal addressed to the nearby user and included in the signals received from subcarrier demapper 245 shows the state of white noise or the state of noise close to white noise.

That is, the minimum inter-signal point distance for the distant user increases on average compared to conventional SCM. Therefore, with signals subjected to IDFT processing, it is possible to reduce the influence of interference from the signal addressed to the nearby user more than ever, and improve the SINR of the time domain signal (corresponding to an interference signal for terminal apparatus 200) addressed to the distant user. Consequently, it is possible to reduce hard decision error in symbol hard decider 265.

Then, DFT section 275 performs DFT processing of the result acquired by performing in symbol hard decider 265 symbol decision of the signals subjected to IDFT processing, to acquire signals matching signals C. Then, a signal combining signals C and signals E is transmitted from the transmitting side, and, consequently, by subtracting the signals resulting from DFT processing, from the output signals of subcarrier mapper 170, it is possible to acquire only signals matching signals E which are the signal addressed to the nearby user.

Further, if decision error occurs in symbol hard decision for extracting an interference signal, it is not possible to accurately extract the interference signal. As a result, the accuracy of suppressing the interference signal decreases, and therefore the receiving performance of the nearby user deteriorates.

However, with SCM, an M-ary modulation value to be applied to the modulated signal addressed to the distant user is lower than an M-ary modulation value to be applied to the modulated signal addressed to the nearby user, and therefore symbol decision error is not likely to occur when terminal apparatus 200 of the nearby user demodulates the signal addressed to the distant user. Further, with Embodiments 1 and 2, the signal addressed to the distant user is transmitted in the state in which symbols are divided into a plurality of frequency components.

Therefore, even if received quality of part of frequency components is poor, the influence of frequency components of poor received quality upon time domain signals acquired from a plurality of frequency components is little. In this way, signals are transmitted according to the method described in Embodiments 1 and 2, so that symbol hard decision error is not likely to occur in symbol hard decision for extracting interference signals.

Further, terminal apparatus 300 differs from terminal apparatus 200 in performing decoding processing in symbol decider 295 without performing interference signal cancellation processing of canceling from a received signal the signal addressed to terminal apparatus 200 of the nearby user.

That is, IDFT section 320 performs IDFT processing of signals received from subcarrier demapper 310, so that signals matching signals C (corresponding to the signal addressed to the distant user) included in the received signals are transformed into time domain signals. By contrast with this, signals matching signals E (corresponding to the signal addressed to the nearby user) included in signals received from subcarrier demapper 310 are transmitted as is as time domain signals, and therefore transformed into frequency domain signals.

That is, the signal addressed to the nearby user and included in the signals received from subcarrier demapper 310 shows the state of white noise or the state of noise close to white noise thanks to IDFT processing. That is, the minimum inter-signal point distance for the distant user increases on average compared to conventional SCM.

Consequently, it is possible to perform accurate symbol decision by using signals subjected to IDFT processing.

As described above, with Embodiments 1 and 2, base station apparatus 100 that transmits a multi carrier signal in which a modulated signal addressed to the distant user and a modulated signal addressed to the nearby user and modulated by a different M-ary modulation value from the modulated signal addressed to the distant user, has: DFT section 120 that divides the modulated signal addressed to the distant user into frequency components on a per symbol basis; S/P section 125 that forms N1 parallel signals by performing serial-to-parallel conversion of the modulated signal addressed to the nearby user; and combiner 145 that combines N1 frequency components acquired in DFT section 120 and the above N1 parallel signals of time domain signals.

By this means, by dividing the modulated signal addressed to the distant user in the frequency domain and then combining the modulated signal with the modulated signal addressed to the nearby user, it is possible to reduce the power ratio of the modulated signal addressed to the distant user, in N1 elements of the combined signal.

Further, given that a combined signal is formed in this way, by performing IDFT processing of the received signal, the receiving side of this combined signal can acquire the modulated signal addressed to the distant user and superimposed in a state in which the signal addressed to the nearby user can be handled as white noise or noise close to white noise. Furthermore, the signal addressed to the distant user is transmitted in a state in which this signal is divided into a plurality of frequency components, so that, even if received quality of part of frequency components deteriorates, the receiving side can demodulate the signal addressed to the distant user using other frequency components of good received quality.

That is, the modulated signal addressed to the distant user is restored accurately. As a result, even if the transmitting side sets $\alpha/\beta$ small to solve the problem of increased quantization noise occurring in conventional SCM, it is possible to improve the receiving performance of the distant user.

Moreover, the modulated signal addressed to the distant user is an interference signal for the nearby user, and, therefore, by canceling from the received signal the accurate modulated signal addressed to the distant user and acquired from IDFT processing, it is possible to accurately acquire only the received signal matching the modulated signal addressed to the nearby user.

Further, with Embodiments 1 and 2, the number of frequency components acquired from the modulated signal addressed to the distant user is made to match with the number of parallel signals acquired from the modulated signal addressed to the nearby user, and the elements of the frequency components and parallel signals are combined on a one-by-one basis. However, the number of frequency components and the number of parallel signals need not to be the same. Further, with Embodiments 1 and 2, all elements of frequency components and parallel signals need not to be combined.

That is to say, the above advantage is acquired as long as the modulated signal addressed to the nearby user is superimposed as is as a time domain signal upon at least part of a plurality of frequency components into which the modulated signal addressed to the distant user is divided in the frequency domain on a per symbol basis. The nearby user can restore the modulated signal which is addressed to the distant user and which is an interference signal for the nearby user, by performing IDFT processing of the combined signal in which at least part of the frequency components are superimposed.

By performing IDFT processing of the above plurality of frequency components included in a received signal, the time domain signal addressed to the nearby user is made white noise, so that the distant user can accurately restore the modulated signal addressed to the distant user.

Further, with Embodiments 1 and 2, terminal apparatus 200 has interference signal extractor 250 that extracts components matching a modulated signal addressed to the distant user by performing an inverse Fourier transform of a received multicarrier signal.

Note that a received multicarrier signal is a signal in which a modulated signal addressed to the nearby user (i.e. terminal apparatus 200) and modulated using a different M-ary modulation value from a modulated signal addressed to the distant user, is superimposed as is as a time domain signal upon a plurality of frequency components into which the modulated signal addressed to the distant users is divided in the frequency domain on a per symbol basis.

By so doing, it is possible to acquire the modulated signal which is addressed to the distant user and in which a signal addressed to the nearby user are superimposed in a state in which the signal addressed to the nearby user can be handled as white noise or noise similar to white noise. That is, it is possible to accurately restore the modulated signal which is addressed to the distant user and which is an interference signal for terminal apparatus 200 of the nearby user.

Further, terminal apparatus 200 has SCM interference suppressor 280 that subtracts components matching the modulated signal addressed to the distant user and extracted in interference signal extractor 250, from the received multicarrier signal.

By this means, by canceling from the received signal an accurate modulated signal which is addressed to the distant user and which is acquired from IDFT processing, it is possible to accurately acquire only signals matching the modulated signal addressed to the nearby user.

Further, if a method of performing transmission by making transmission power of a pilot signal match with transmission power for the distant user (FIG. 8A) is employed for a method of transmitting a channel estimation pilot signal, transmission power offset compensator 330 is not necessary in terminal apparatus 300 of the distant user. Furthermore, in this case, transmission power offset compensator 260 and transmission power offsetter 270 are not necessary in terminal apparatus 200 of the nearby user. This is because terminal apparatus 200 can acquire a channel estimation value based on the signal addressed to the distant user.

Further, terminal apparatus 200 may perform processing using an orthogonal transformation matrix having unitarity instead of performing processings in IDFT section 255 and DFT section 275. In this case, it is also possible to acquire the same advantage as described above.

Further, before and after DFT section 275, base station apparatus 100 may provide low pass filters (e.g. raised cosine roll-off filters) for suppressing peaks. By this means, it is possible to reduce PAPR and reduce interference to other users.

Although Embodiments 1 and 2 have been explained assuming that signals transmitted from the base station apparatus are dedicated data signals for individual users (i.e. terminal apparatuses), broadcast data or multicast data is equally possible.

Further, as to signals transmitted from the base station, signals transmitted to MS #1 may be dedicated data signals, and signals transmitted to MS #2 may be broadcast data or multicast data.

By contrast with this, as to signals transmitted from the base station apparatus, signals transmitted to MS #2 may be dedicated data signals, and signals transmitted to MS #1 may be broadcast data or multicast data. These apply likewise in the following embodiments.

Embodiment 3

The present embodiment is the same as Embodiments 1 and 2 in transmitting a signal in which a second modulated signal is superimposed as is as a time domain signal upon a plurality of frequency components into which a first modulated signal is divided in the frequency domain on a per symbol basis. However, while, with Embodiments 1 and 2, the first modulated signal and the second modulated signal are addressed to the distant user and nearby user, respectively, with the present embodiment, the first modulated signal and second modulated signal are addressed to the nearby user and distant user, respectively.

That is, the base station apparatus according to the present embodiment has the same configuration as base station apparatus 100 shown in FIG. 3. However, modulator 110, DFT section 120 and multiplier 135 process signals addressed to the nearby user, and modulator 115, S/P section 125 and multiplier 140 process signals addressed to the distant user. Therefore, transmission power coefficients α and β determined in SCM transmission power controller 130 are used in multiplier 140 and multiplier 135. Further, transmission power coefficients α and β are the same as the transmission power coefficients explained in Embodiments 1 and 2.

Then, combiner 145 superimposes signals acquired by multiplying output subcarriers D_SC(k) of DFT section 120 with transmission power coefficient β, and signals acquired by multiplying output subcarriers S_SC(k) of S/P section 125 with transmission power coefficient α. To be more specific, a combined signal is determined from βD_SC(k)+αS_SC(k). Here, K=1~N1.

Embodiment 4

Figure 9:
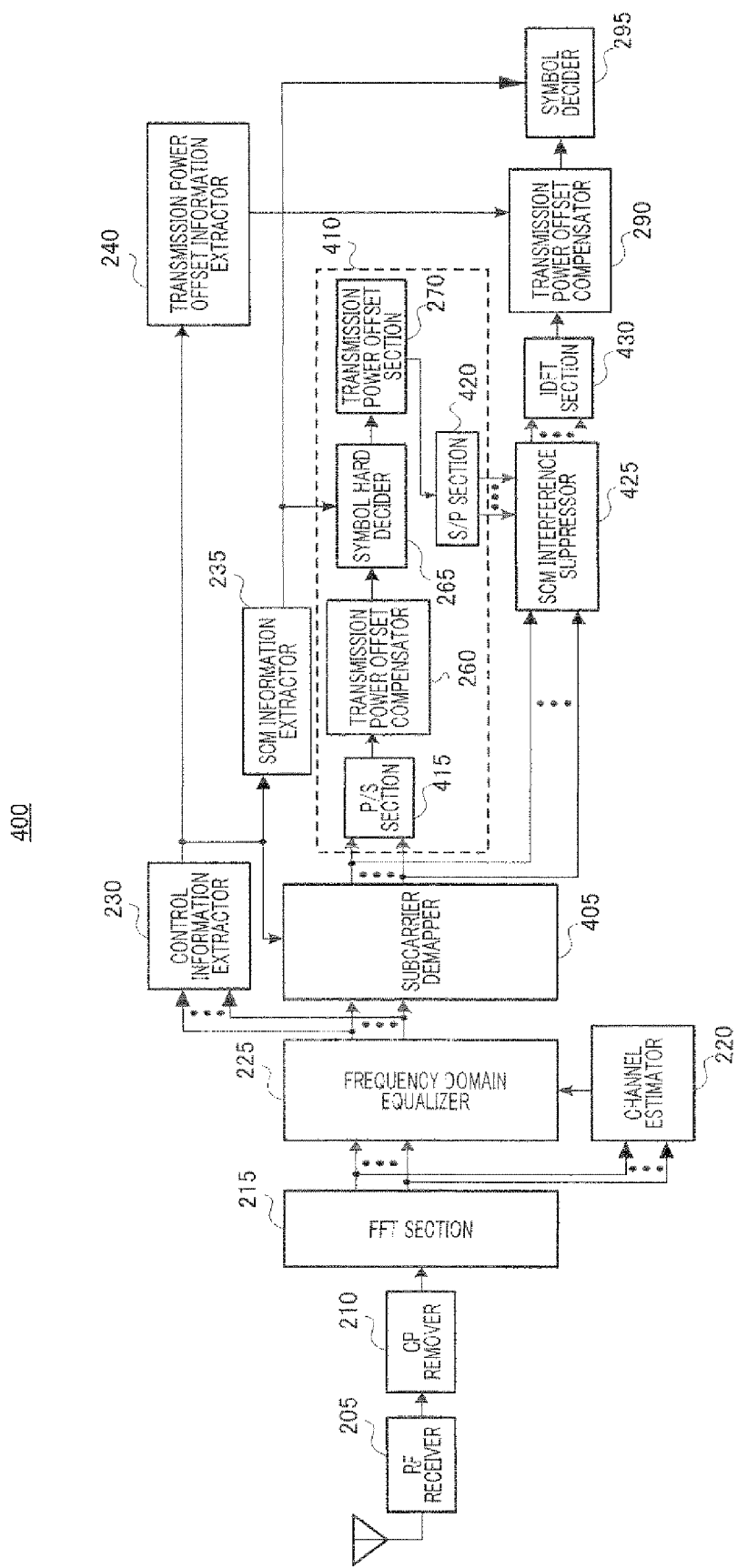
FIG. 9 is a block diagram showing a main configuration of a terminal apparatus (of a nearby user) according to Embodiment 4.

As shown in FIG. 9, terminal apparatus 400 that is a multicarrier signal receiving apparatus according to the present embodiment, has subcarrier demapper 405, interference signal extractor 410, SCM interference suppressor 425 and IDFT section 430. Interference signal extractor 410 has P/S section 415 and S/P section 420. Particularly, FIG. 9 shows a configuration of terminal apparatus 400 that is the nearby user located close to base station apparatus 100.

Subcarrier demapper 405 outputs a subcarrier group allocated to a signal addressed to terminal apparatus 400, to interference signal extractor 410 based on frequency resource allocation information included in the common control information extracted in control information extractor 230. With the Embodiments 3 and 4 the signal addressed to the nearby user is divided into N1 frequency components on a per symbol basis and is transmitted, and therefore the subcarrier group is formed with N1 parallel signals including N1 frequency components. Further, with Embodiments 3 and 4, the signal addressed to the distant user is superimposed as the time domain signal upon each of these N1 parallel signals.

Interference signal extractor 410 extracts from output signals of subcarrier demapper 405 the signal which is addressed to the distant user and which is an interference signal for terminal apparatus 400. Further, as described above, in a transmission signal from base station apparatus 100 of the transmitting side, the modulated signal addressed to the distant user is superimposed as is as a time domain signal upon a plurality of frequency components into which the modulated signal addressed to the nearby user is divided in the frequency domain on a per symbol basis. That is, also in the output signals of subcarrier demapper 405, the modulated signal addressed to the distant user is superimposed as is as a time domain signal upon a plurality of frequency components into which the modulated signal addressed to the nearby user is divided in the frequency domain on a per symbol basis.

To be more specific, P/S section 415 of interference signal extractor 410 converts parallel signals into a serial signal by performing parallel-to-serial conversion processing of N1 parallel signals received from subcarrier demapper 405.

S/P section 420 performs serial-to-parallel conversion processing of the decision result in symbol hard decider 265, assuming as a processing unit the decision results matching N1 parallel signals which are the target of parallel-to-serial conversion processing in P/S section 415. This signal subjected to serial-to-parallel conversion processing is the signal which is addressed to the distant user and which is an interference signal for terminal apparatus 400 of the nearby user, and, to be more specific, is formed with the N1 parallel signals addressed to the distant user.

SCM interference suppressor 425 subtracts from the N1 parallel signals outputted from subcarrier demapper 405 the signal addressed to the distant user and extracted in interference signal extractor 410 from the N1 parallel signals. By so doing, it is possible to cancel the signal which is addressed to the distant user and which is superimposed upon the signal addressed to terminal apparatus 400 of the nearby user. That is, the output signals from SCM interference suppressor 425 are formed with N1 frequency components into which the modulated signal addressed to the nearby user is divided on a per symbol basis.

IDFT section 430 performs transformation from the frequency domain into the time domain by performing IDFT processing of the output signals of SCM interference suppressor 425 based on the size of N1. The frequency components distributed in the frequency domain are collected in this way, so that symbols before distribution are restored.

Figure 10:
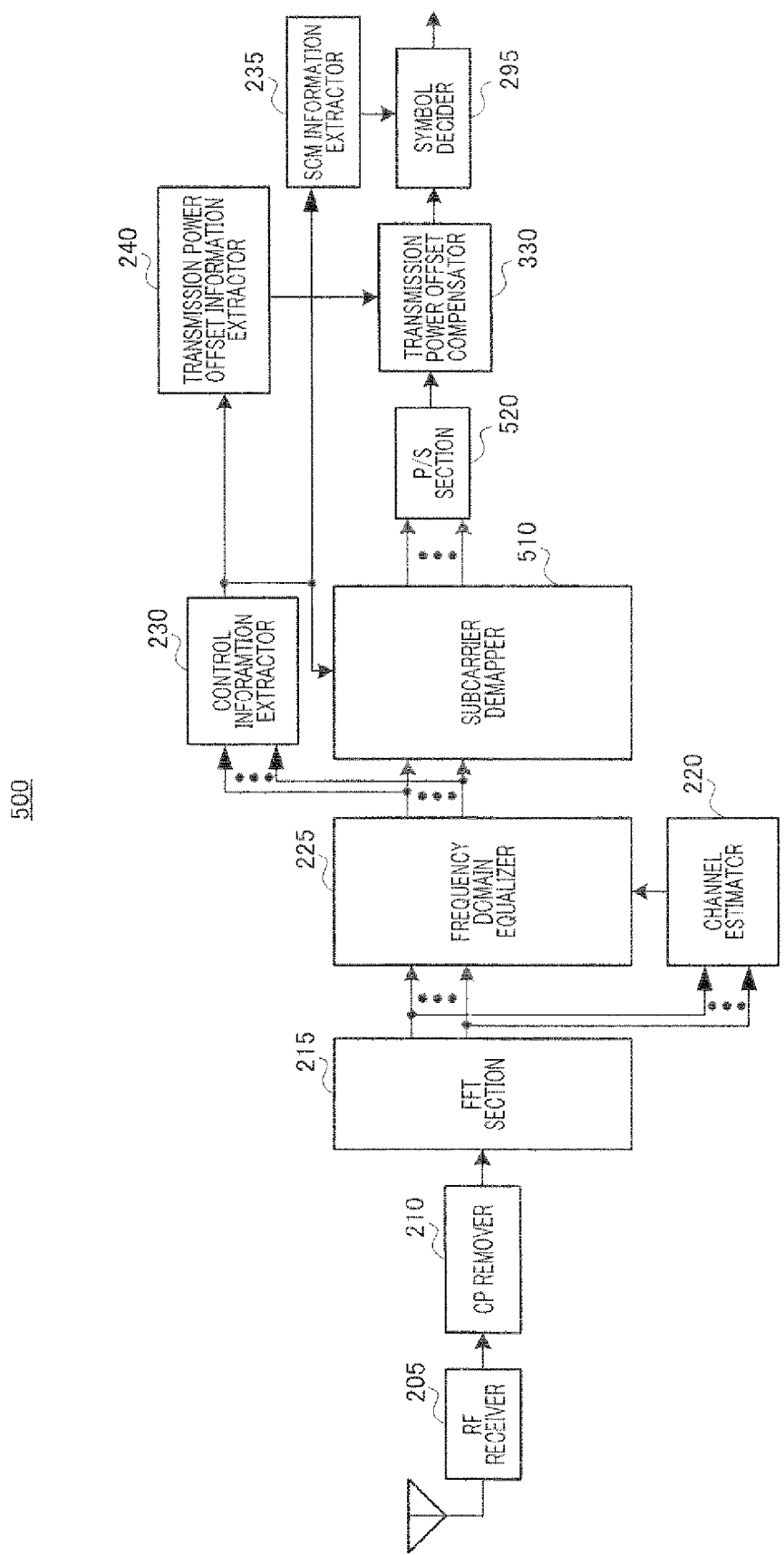
FIG. 10 is a block diagram showing a main configuration of a terminal apparatus (of a distant user) according to Embodiment 4.

As shown in FIG. 10, terminal apparatus 500 that is a multicarrier signal receiving apparatus according to the present embodiment, has subcarrier demapper 510 and P/S section 520. Particularly, FIG. 10 shows a configuration of terminal apparatus 500 that is the distant user located far from base station apparatus 100.

Subcarrier demapper 510 outputs to P/S section 520 a subcarrier group allocated to the signal addressed to terminal apparatus 500, based on frequency resource allocation information included in the common control information extracted in control information extractor 230. With the Embodiments 3 and 4, the signal addressed to the distant user is divided into N1 parallel signals and transmitted, and therefore its subcarrier group is formed with N1 parallel signals. Further, with Embodiments 3 and 4, frequency components into which the signal addressed to the nearby user is divided on a per symbol basis are superimposed upon N1 parallel signals.

P/S section 520 performs parallel-to-serial conversion of output signals of subcarrier demapper 510, based on the size of N1.

Next, the operations of terminal apparatus 400 and terminal apparatus 500 having the above configurations will be explained.

Terminal apparatus 400 cancels the signal addressed to terminal apparatus 500 of the distant user, from the received signal transmitted from the base station apparatus of Embodiment 3, and then performs decoding processing in symbol decider 295.

To be more specific, interference signal extractor 410 receives signals matching the combined signal combined in combiner 145 of the base station apparatus, from subcarrier demapper 405. Further, apart from terminal apparatus 200 of Embodiment 1, interference signal extractor 410 performs symbol hard decision processing without transforming the output signals of subcarrier demapper 405 from the frequency domain into the time domain.

This is because, with Embodiments 3 and 4, the signal which is addressed to the distant user and which is an interference signal for terminal apparatus 400 is superimposed as is as a time domain signal upon frequency components into which the signal addressed to terminal apparatus 400 is divided on a per symbol basis. That is, the signal which is addressed to the nearby user and which is included in the signals received from subcarrier demapper 405 shows the state of white noise or the state of noise similar to white noise.

Consequently, the signals received from subcarrier demapper 405 allow the signal addressed to the nearby user to be ignored and can be handled assuming that only a time domain signal (i.e. an interference signal for terminal apparatus 400) addressed to the distant user is present.

Then, by performing serial-to-parallel conversion of the result acquired by performing in symbol hard decider 265 symbol decision of the signals from subcarrier demapper 405, it is possible to acquire signals matching the output signals of S/P section 125 of the transmitting side. Further, a signal combining signals C and signals E is transmitted from the transmitting side, so that it is possible to acquire only the signal addressed to the nearby user by subtracting the signals acquired in S/P section 420 from the output signals of subcarrier demapper 405.

Furthermore, if decision error occurs in symbol hard decision to extract the interference signal, it is not possible to accurately extract the interference signal. As a result, the accuracy of suppressing the interference signal decreases, and therefore the receiving performance of the nearby user deteriorates. However, with SCM, the M-ary modulation value to be applied to the modulated signal addressed to the distant user is lower than the modulated signal addressed to the nearby user, and therefore symbol decision error is not likely to occur if terminal apparatus 400 of the nearby user demodulates the signal addressed to the distant user.

Further, with Embodiments 3 and 4, the signal addressed to the nearby user is transmitted in the state in which symbols are divided into a plurality of frequency components. Therefore, even if received quality of part of frequency components is poor, the influence of frequency components of poor received quality upon time domain signals acquired in IDFT section 430 from a plurality of frequency components is little. In this way, signals are transmitted according to the method described in Embodiments 3 and 4, so that symbol decision error is not likely to occur in symbol decider 295 of terminal apparatus 400 of the nearby user.

Further, terminal apparatus 500 differs from terminal apparatus 400 in performing decoding processing in symbol decider 295 without performing interference signal cancellation processing of canceling from the received signal the signal addressed to terminal apparatus 400 of the nearby user. This is because the signal addressed to the nearby user and included in the output signals of subcarrier demapper 405 shows the state of white noise or the state of noise close to white noise.

As described above, with Embodiments 3 and 4, base station apparatus 100 that transmits a multicarrier signal in which the modulated signal addressed to the distant user and the modulated signal addressed to the nearby user and modulated by a different M-ary modulation value from the modulated signal addressed to the distant user, has: DFT section 120 that divides the modulated signal addressed to the nearby user into frequency components on a per symbol basis; S/P section 125 that forms N1 parallel signals by performing serial-to-parallel conversion of the modulated signal addressed to the nearby user; and combiner 145 that combines N1 frequency components acquired in DFT section 120 and the above N1 parallel signals of time domain signals.

By this means, by dividing the modulated signal addressed to the nearby user into frequency components and then combining the modulated signal with the modulated signal addressed to the distant user, it is possible to reduce the power ratio of the modulated signal addressed to the nearby user, in N1 elements of the combined signal.

Further, a combined signal is formed in this way, so that the distant user receiving this combined signal can acquire the modulated signal addressed to the distant user and superimposed in a state in which the signal addressed to the nearby user can be handled as white noise or noise close to white noise. By this means, the minimum inter-signal point distance of received symbols for the distant user increases on average compared to conventional SCM. As a result, the receiving performance of the distant user improves.

Further, the modulated signal addressed to the distant user is an interference signal for the nearby user, and, therefore, by canceling from the received signal the modulated signal addressed to the distant user and acquired in the same way as in reception processing by the distant user, the nearby user can accurately acquire only the received signal matching the modulated signal addressed to the nearby user. Furthermore, the signal addressed to the nearby user is transmitted in a state in which the signal addressed to the nearby user is divided into a plurality of frequency components, and therefore, even if received quality of part of frequency components deteriorates, the nearby user can accurately demodulate the signal addressed to the nearby user by using other frequency components of good received quality.

Further, with Embodiments 3 and 4, the number of frequency components acquired from the modulated signal addressed to the nearby user is made to match with the number of parallel signals acquired from the modulated signal addressed to the distant user, and the elements of the frequency components and parallel signals are combined on a one-by-one basis. However, the number of frequency components and the number of parallel signals need not to be the same. Further, with Embodiments 3 and 4, all elements of frequency components and parallel signals need not to be combined.

That is to say, the above advantage is acquired as long as the modulated signal addressed to the distant user is superimposed as is as a time domain signal upon at least part of a plurality of frequency components into which the modulated signal addressed to the nearby user is divided in the frequency domain on a per symbol basis. The nearby user can restore the modulated signal which is addressed to the distant user and which is an interference signal for the nearby user, only by performing symbol hard decision of the combined signal in which at least part of the frequency components are superimposed. The signal addressed to the nearby user and included in a received signal are made white noise, so that the distant user can accurately restore the signal addressed to the distant user only by performing symbol decision of the received signal.

Further, with Embodiments 3 and 4, terminal apparatus 400 has: interference signal extractor 410 that performs symbol hard decision of a received multicarrier signal and extracts components matching the modulated signal addressed to the distant user; and interference signal suppressor 425 that subtracts from the received multicarrier signal the components matching the modulated signal addressed to the distant user and extracted in interference signal extractor 410.

Note that a received multicarrier signal is a signal in which the modulated signal addressed to the distant user and modulated using a different M-ary modulation value from the modulated signal addressed to the nearby user, is superimposed as is as a time domain signal upon a plurality of frequency components into which the modulated signal addressed to the nearby user is divided in the frequency domain on a per symbol basis.

By this means, by canceling from the received signal the modulated signal (corresponding to an interference signal for the nearby user) addressed to the distant user and restored accurately, it is possible to acquire only a received signal matching the modulated signal addressed to the nearby user.

Further, if a method of performing transmission by making transmission power of a pilot signal match with transmission power for the distant user (FIG. 4A) is employed for a method of transmitting a channel estimation pilot signal, transmission power offset compensator 330 is not necessary in terminal apparatus 500 of the distant user. Furthermore, in this case, transmission power offset compensator 260 and transmission power offsetter 270 are not necessary in terminal apparatus 400 of the nearby user. This is because terminal apparatus 400 can acquire a channel estimation value based on the signal addressed to the distant user.

Embodiment 5

Figure 11:
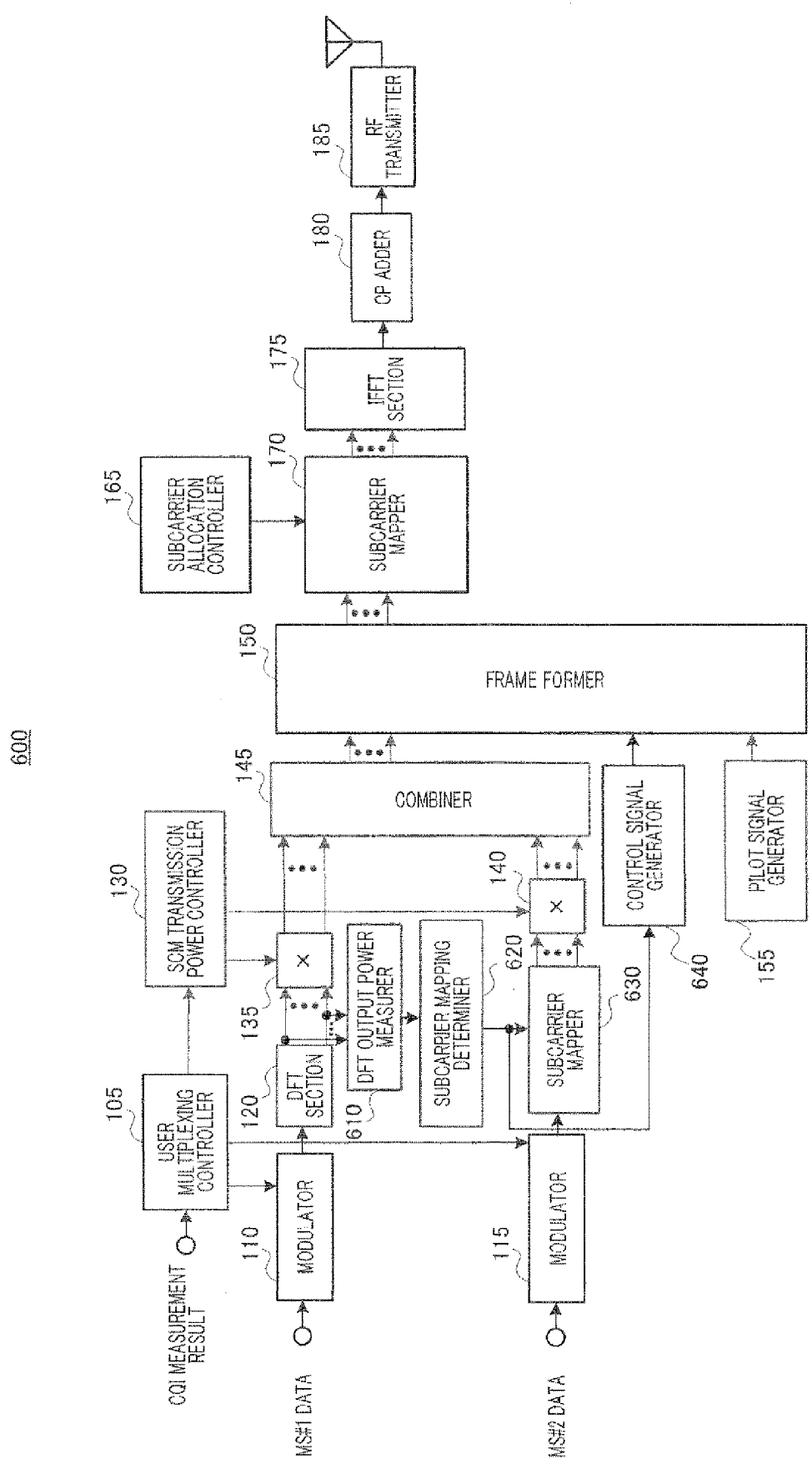
FIG. 11 is a block diagram showing a main configuration of a base station apparatus according to Embodiment 5.

FIG. 11 is a block diagram showing a configuration of base station apparatus 600 that is a multicarrier transmitting apparatus according to Embodiment 5. Similar to base station apparatus 100, base station apparatus 600 transmits a signal in which the second modulated signal is superimposed as is as a time domain signal upon a plurality of frequency components into which the first modulated signal is divided in the frequency domain on a per symbol basis.

Note that, as shown in FIG. 11, base station apparatus 600 differs from base station apparatus 100 in the configuration as follows. That is, base station apparatus 600 has: DFT output power measurer 610 that measures amplitudes of subcarriers outputted from DFT section 120 every predetermined subcarrier blocks for a predetermined period; subcarrier mapping determiner 620 that determines subcarriers to map output modulated signals acquired by modulating outputs of DFT section 120 based on the outputs of DFT output power measurer 610; control signal generator 640 that generates a control signal including mapping information determined in subcarrier mapping determiner 620; and, instead of S/P section 125 of base station apparatus 100, subcarrier mapper 630 that maps the output modulated signal of modulator 115 on subcarriers based on subcarrier mapper 620.

Further, FIG. 11 shows a configuration of a base station apparatus in case where OFDMA is applied. Hereinafter, a case will be explained where SCM transmission is performed using N1 subcarriers. Here, in case where N_FFT is assumed as an FFT size in the IFFT (Inverse Fast Fourier Transform) section, the relationship $N1 \geq N\_FFT$ holds.

A case will be explained below assuming the number of subcarriers N1 in DFT section 120 allocated to the output of modulator 110 is made greater than the number of subcarriers N2 allocated to the output of modulator 115, that is, $N1 > N2$ holds.

DFT output power measurer 610 measures power of frequency subcarrier signals outputted from DFT outputting section 120. This power measurement is performed every predetermined subcarrier blocks for a predetermined period. That is, this power measurement makes it possible to acquire a power value per unit measurement time of each subcarrier block.

Here, a predetermined number of subcarrier blocks may be fixed, or a number of subcarrier blocks acquired by fixing the number of subcarrier blocks to divide, and dividing an output subcarrier group of DFT section 120 may be possible. Instead, a number of predetermined subcarrier blocks may be varied according to the number of output subcarriers N1 of DFT section 120 and the number of subcarriers N2 allocated to the output of modulator 115.

Further, an OFDMA symbol, a period which is formed with a plurality of OFDMA symbols and in which SCM is performed per user, or a frame, may be used for the unit measurement time. When a unit measurement time is shorter, although it is possible to follow more instantaneous variation, the frequency of changing mapping by subcarrier mapping determiner 620 is higher.

Therefore, a trade-off occurs where an overhead of a control information notice reported to a terminal apparatus increases. Accordingly, for the unit measurement time, it is suitable to use a period formed with a plurality of OFDMA symbols subjected to user multiplexing.

Subcarrier mapping determiner 620 determines subcarriers to map the output modulated signal of modulator 115 for the outputs of DFT section 120, based on the output of DFT output power measurer 610. Here, subcarrier mapping determiner 620 selects subcarriers from a subcarrier block of a smaller power value measured in DFT output power measurer 610 until the total number of subcarriers reaches N2.

By this means, subcarrier blocks of greater power values measured in DFT output power measurer 610 are excluded from mapping target subcarriers on which the output modulated signal of modulator 115 is mapped. Subcarrier mapping determiner 620 outputs information related to the determined mapping target subcarriers, to subcarrier mapper 630. This information related to the mapping target subcarriers is regularly transmitted per unit measurement time.

Subcarrier mapper 630 maps the output modulated signal of modulator 115 on the mapping target subcarriers determined in subcarrier mapping determiner 620. Subcarrier mapper 630 is configured to output a number of subcarriers greater than N2 and less than N1. The subcarriers match output subcarriers of DFT section 120 on a one-by-one basis.

Consequently, subcarrier mapper 630 maps the output modulated signal of modulator 115 on the mapping target subcarriers determined in subcarrier mapping determiner 620, so that it is possible to map the output modulated signal of modulator 115 only on subcarriers matching output subcarriers of DFT section 120 and having small measurement power.

Control signal generator 640 receives information related to the mapping target subcarriers from subcarrier mapping determiner 620, and generates a control signal including this information. This control information is outputted to frame former 150. By this means, it is possible to report the mapping target subcarriers to terminal apparatuses of the communicating party.

Figure 12:
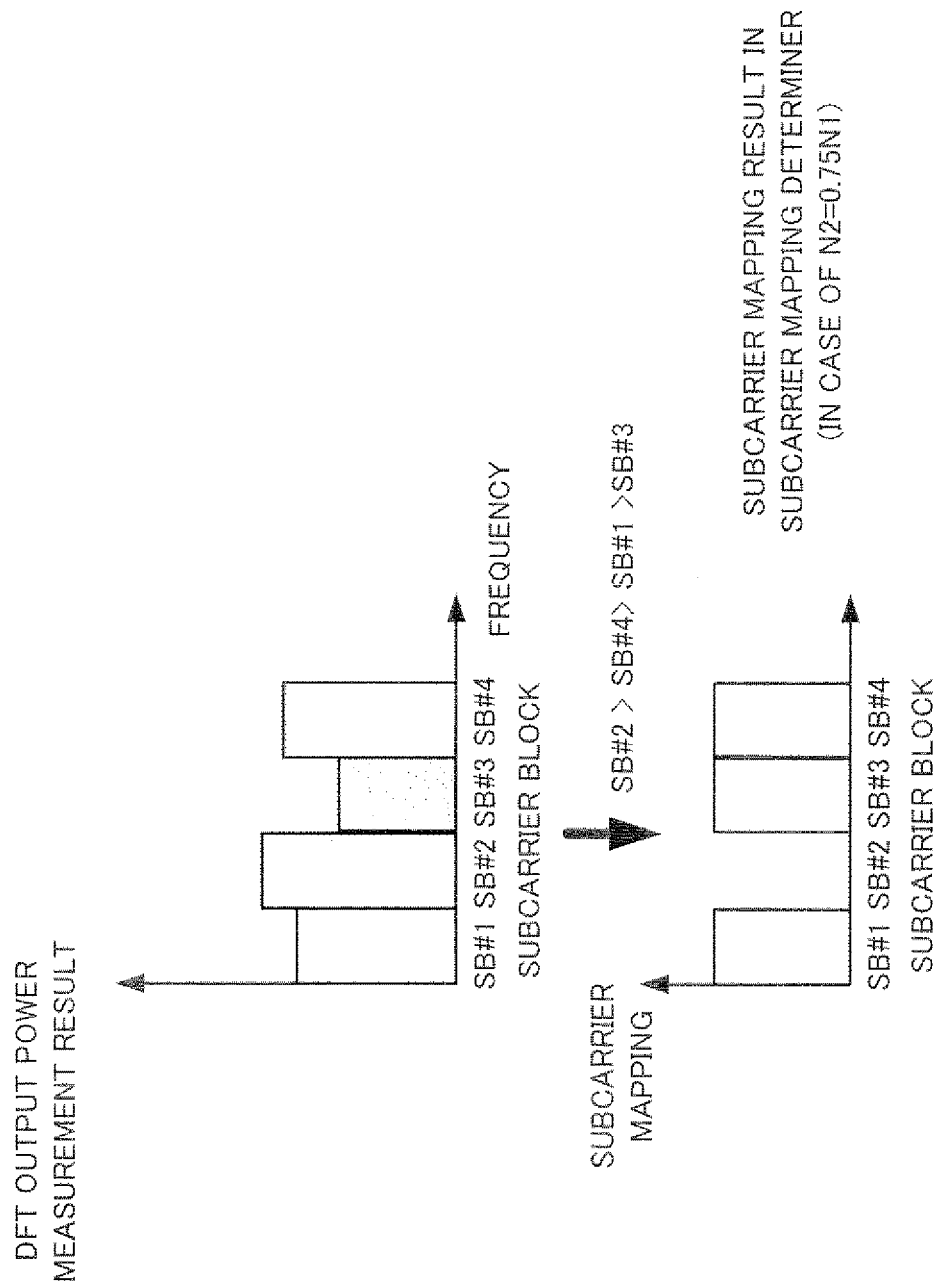
FIG. 12 illustrates operations of a DFT output power measurer, a subcarrier mapping determiner and a subcarrier mapper.

Here, the operations of DFT output power measurer 610, subcarrier mapping determiner 620 and subcarrier mapper 630 will be explained. FIG. 12 illustrates the operations of DFT output power measurer 610, subcarrier mapping determiner 620 and subcarrier mapper 630.

In the upper part of FIG. 12, a power measurement result in DFT output power measurer 610 is shown. Here, division number D_N1=4 is set with respect to output subcarriers of DFT section 120 allocated to the output of modulator 110 (the number of output subcarriers is N1 as described above), and, as a result, four subcarrier blocks (SB #1 to #4 in FIG. 12) are provided.

Further, the unit measurement time corresponds to the number of OFDMA symbols N_sym subjected to user multiplexing. That is, in the upper part of FIG. 12, a result of adding power values (or amplitude values) of subcarrier blocks SB #k (k=1, . . . , D_N1) in a unit measurement time is shown. Further, in the upper part of FIG. 12, SB #2>SB #4>SB #1>SB #3 holds in order from a higher power measurement result.

Based on this measurement result in DFT output power measurer 610, subcarrier mapping determiner 620 determines mapping target subcarriers. Subcarrier mapping determiner 620 selects subcarriers from subcarrier blocks of smaller power values measured in DFT output power measurer 610 until the total number of constituent subcarriers reaches N2.

If N2=0.75N, SB #1, SB #3 and SB #4 except subcarrier block SB #2 having the greatest power value, are selected.

Further, as shown in the lower part of FIG. 12, subcarrier mapper 630 maps the output modulated signal of modulator 115, on the mapping target subcarriers determined in subcarrier mapping determiner 620.

Further, if division number D_N1=4 and N2=0.75N1 hold, it is possible to report information related to the mapping target subcarriers to terminal apparatuses using two bits at most.

According to the above configuration, base station apparatus 600 can map the modulated signal of modulator 115 on subcarriers of comparatively small power among the output subcarriers of DFT section 120. By this means, it is possible to increase transmission SINR of modulator 115, and, as a result, improve the receiving performance of terminal apparatuses of the receiving side.

Embodiment 6

Figure 13:
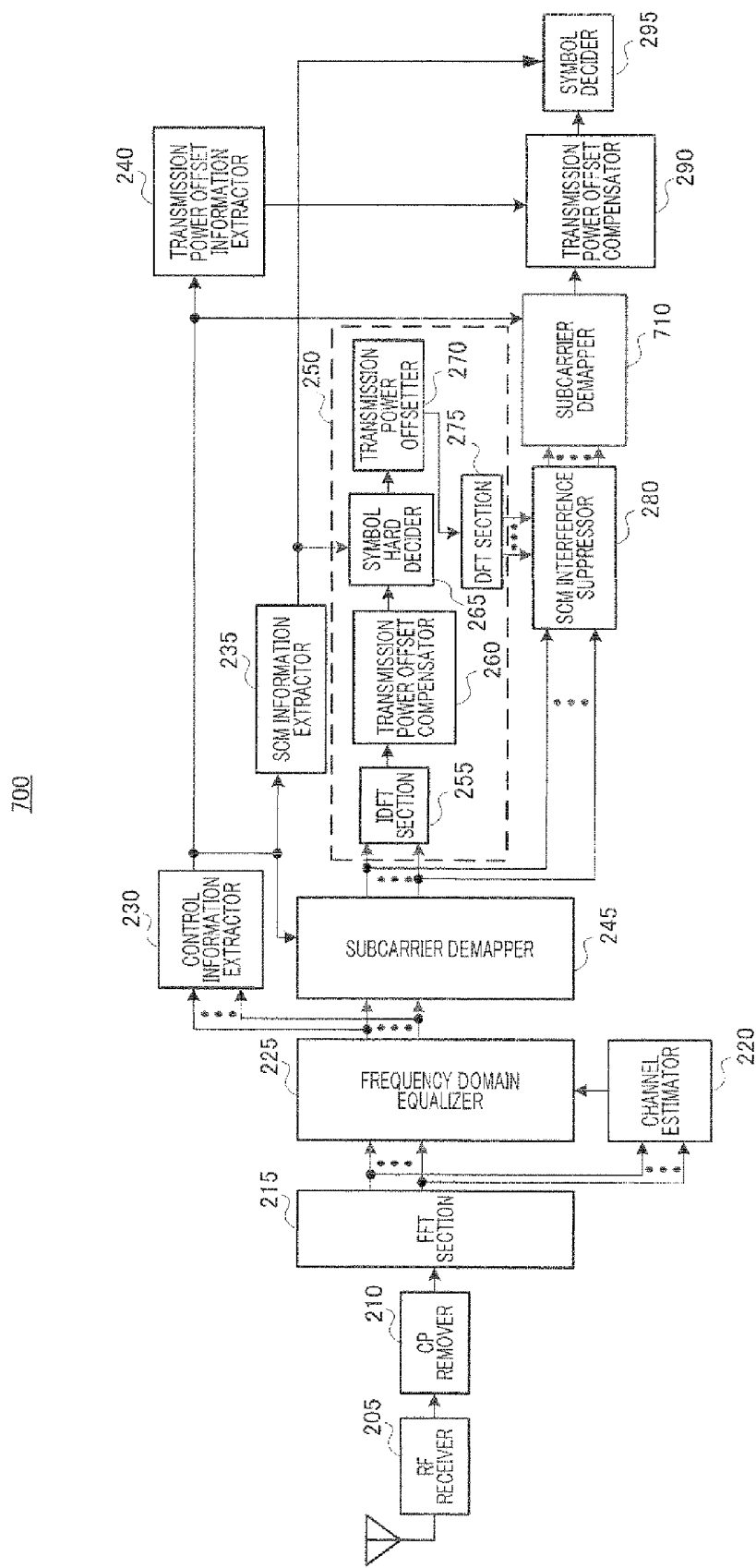
FIG. 13 is a block diagram showing a main configuration of a terminal apparatus (of a nearby user) according to Embodiment 6.

FIG. 13 is a block diagram showing terminal apparatus 700 that is a multicarrier signal receiving apparatus according to Embodiment 6. Particularly, FIG. 13 shows a configuration of terminal apparatus 700 that is the nearby user located close to base station apparatus 600.

As shown in FIG. 13, terminal apparatus 700 differs from terminal apparatus 200 shown in FIG. 6 and explained in Embodiment 2 in the configuration as follows. That is, terminal apparatus 700 has subcarrier demapper 710 instead of P/S section 285.

Control information extractor 230 restores control information by applying demodulation and decoding processing to the portion corresponding to the control signal in the output signals of frequency domain equalizer 225. The control information that is restored includes information related to the mapping target subcarriers determined in subcarrier mapping determiner 620 of base station apparatus 600.

Subcarrier demapper 710 extracts only the signals matching the mapping target subcarriers in the N1 parallel signals outputted from SCM interference suppressor 280, based on the information related to the mapping target subcarriers and received from control information extractor 230, and outputs these signals as a serial signal to transmission power offset compensator 290.

Here, information related to the mapping target subcarriers is transmitted per unit measurement time. An OFDMA symbol, a period which is formed with a plurality of OFDMA symbols and in which SCM is performed per user, or a frame, may be used for this unit measurement time. This information needs to be recognized by terminal apparatus 700.

Accordingly, the information as to which period is used for a unit measurement time is included in the control signal and reported to terminal apparatus 700 from base station apparatus 600. Particularly, if a period formed with a plurality of OFDMA symbols in which SCM is performed per user is used, this period is reported together with frequency resource allocation information.

According to the above configuration, even when mapping target subcarriers are changed every unit measurement time, terminal apparatus 700 can receive a second modulated signal addressed to terminal apparatus 700.

Further, the terminal apparatus of Embodiment 2 shown in FIG. 7 is applicable to the terminal apparatus that is the distant user located far from base station apparatus 600. Furthermore, with Embodiments 5 and 6, part of output subcarriers of DFT section 120 addressed to the distant user are outputted without being subjected to hierarchical modulation multiplexing (using SCM). By this means, transmission SINR of part of these output subcarriers is increased, so that the advantage of improving received quality is anticipated.

As described above, according to Embodiments 5 and 6, base station apparatus 600 has: DFT section 120 that forms N1 subcarrier signals by dividing a first modulated signal in the frequency domain on a per symbol basis; subcarrier mapper 630 that is configured to output N1 parallel signals matching N1 subcarrier signals on a one-by-one basis, forms N2 parallel signals where N1 is smaller than N2, by performing serial-to-parallel conversion of a second modulated signal and outputs the N2 parallel signals as parallel signals matching mapping target subcarriers; DFT output power measurer 610 that measures power of a plurality of subcarrier signals outputted from DFT section 120; and subcarrier mapping determiner 620 that determines mapping target subcarriers based on the measured power values.

By so doing, it is possible to map a second modulated signal on subcarriers of comparatively small power in the output subcarriers of DFT section 120. Consequently, it is possible to increase transmission SINR of the second modulated signal and, as a result, improve the receiving performance of terminal apparatuses of the receiving side.

Although measuring power and determining a mapping position of the second modulated signal are performed in subcarrier block units, the present invention is not limited to this, and measuring power and determining the mapping position of the second modulated signal may be performed in subcarrier units.

Embodiment 7

The present embodiment is the same as Embodiments 5 and 6 in transmitting a signal in which a second modulated signal is superimposed as is as a time domain signal upon a plurality of frequency components into which a first modulated signal is divided in the frequency domain on a per symbol basis. However, while, with Embodiments 5 and 6, a first modulated signal and a second modulated signal are addressed to the distant user and nearby user, respectively, with the present embodiment, the first modulated signal and the second modulated signal are addressed to the nearby user and distant user, respectively.

That is, the base station apparatus according to the present embodiment has the same configuration as base station apparatus 600 shown in FIG. 11. However, modulator 110, DFT section 120 and multiplier 135 process signals addressed to the nearby user, and modulator 115, subcarrier mapper 630 and multiplier 140 process signals addressed to the distant user. Therefore, transmission power coefficients α and β determined in SCM transmission power controller 130 are used in multiplier 140 and multiplier 135, respectively. Note that transmission power coefficients α and β are the same as transmission power coefficients α and β explained in Embodiments 1 and 2.

Further, combiner 145 superimposes signals acquired by multiplying output subcarriers D_SC(k) of DFT section 120 with transmission power coefficient β, and signals acquired by multiplying output subcarriers S_SC(k) of subcarrier mapper 630 with transmission power coefficient α. To be more specific, a combined signal is determined from βD_SC(k)+αS_SC(k). Here, k=1~N1.

Figure 14:
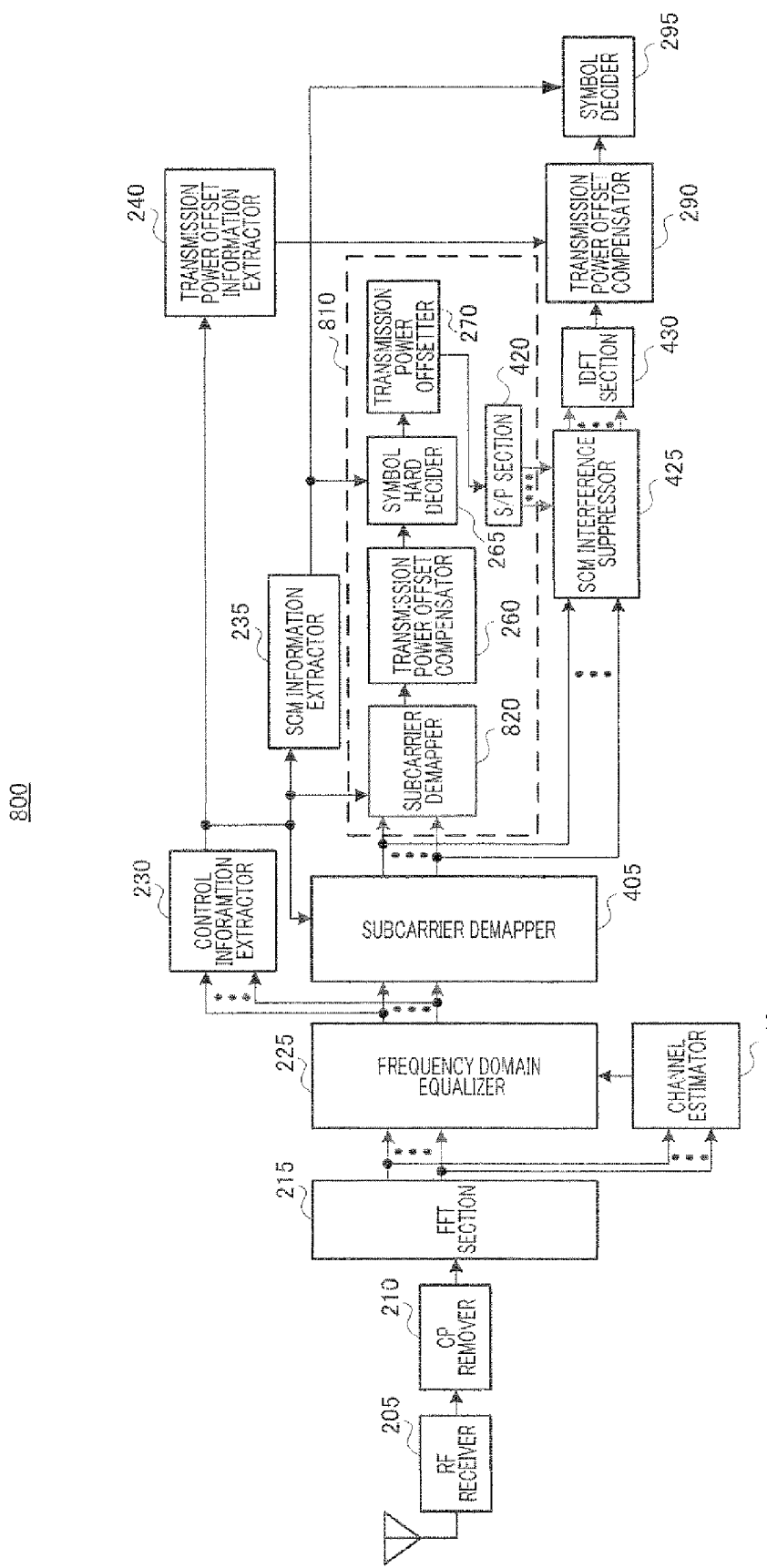
FIG. 14 is a block diagram showing a main configuration of a terminal apparatus (of a nearby user) according to Embodiment 7.

FIG. 14 is a block diagram showing a configuration of terminal apparatus 800 that is a multicarrier signal receiving apparatus according to Embodiment 7. Particularly, FIG. 14 shows a configuration of terminal apparatus 800 that is the nearby user located close to the base station apparatus. Terminal apparatus 800 differs from terminal apparatus 400 shown in FIG. 9 and explained in Embodiment 4 in that, instead of P/S section 415, interference signal extractor 810 has subcarrier demapper 820.

Control information extractor 230 restores control information by applying demodulation and decoding processing to the portion corresponding to the control signal in the output signals of the frequency domain equalizer. The restored control information includes information related to mapping target subcarriers determined in subcarrier mapping determiner 620 of base station apparatus 600.

Subcarrier demapper 820 extracts only the signals matching the mapping target subcarriers in the N1 parallel signals outputted from subcarrier demapper 405, based on information related to the mapping target subcarriers and received from control information extractor 230, and outputs these signals as a serial signal to transmission power offset compensator 260.

Here, information related to the mapping target subcarriers is transmitted per unit measurement time. An OFDMA symbol, a period which is formed with a plurality of OFDMA symbols and in which SCM is performed per user, or a frame, may be used for a unit measurement time. This information needs to be recognized by terminal apparatus 800.

Accordingly, the information as to which period is used for a unit measurement time is included in the control signal and reported to terminal apparatus 800 from base station apparatus 600. Particularly, if a period formed with a plurality of OFDMA symbols in which SCM is performed per user is used, this period is reported together with frequency resource allocation information.

According to the above configuration, even if mapping target subcarriers of a second modulated signal are changed every unit measurement time, terminal apparatus 800 can receive a first modulated signal addressed to terminal apparatus 800 by canceling the second modulated signal which is an interference signal for terminal apparatus 800.

Embodiment 8

Figure 15:
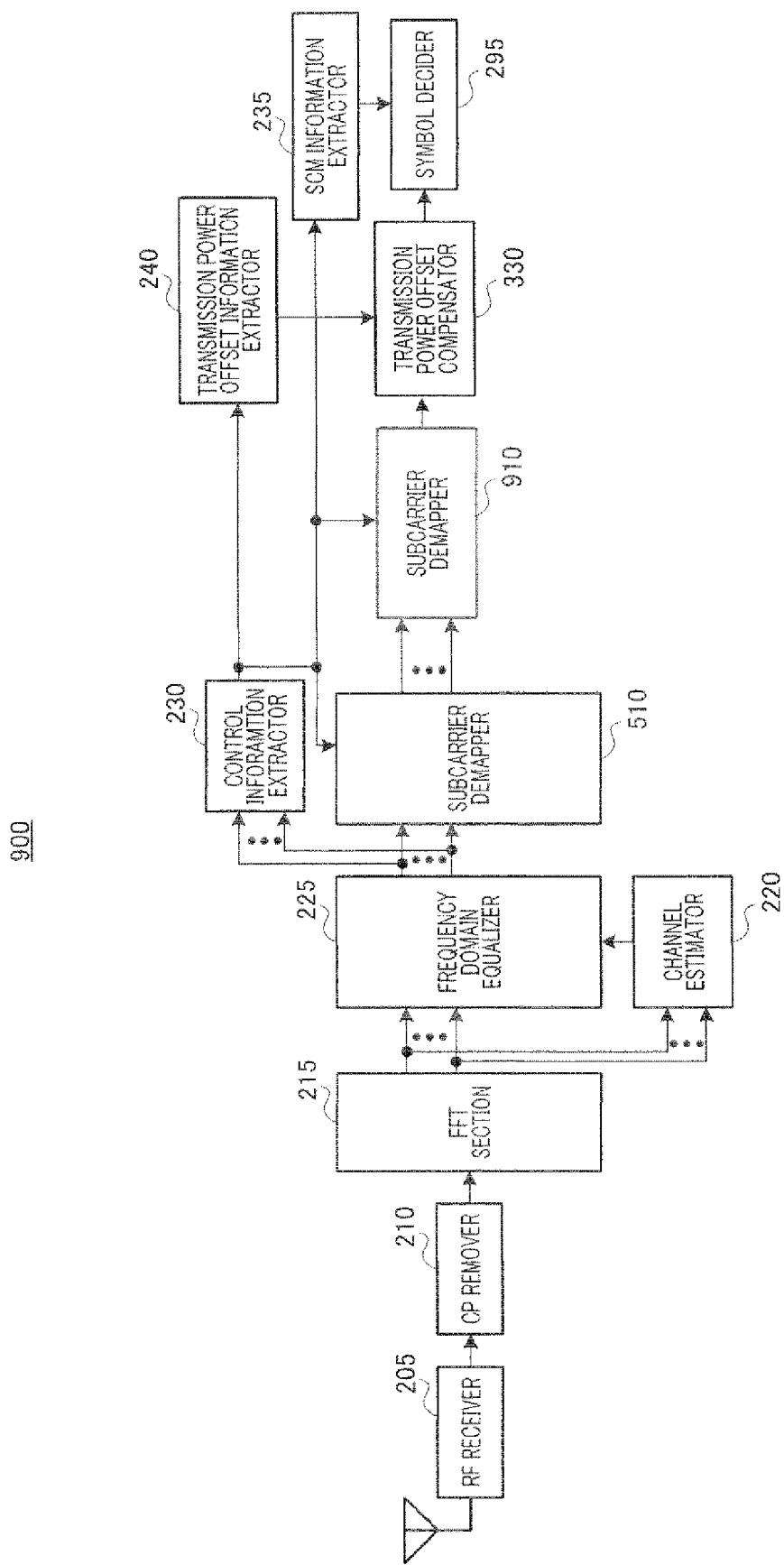
FIG. 15 is a block diagram showing a main configuration of a terminal apparatus (of a distant user) according to Embodiment 8.

FIG. 15 is a block diagram showing a configuration of terminal apparatus 900 that is a multicarrier signal receiving apparatus according to Embodiment 8. Particularly, FIG. 15 shows a configuration of terminal apparatus 900 that is the distant user located far from the base station apparatus.

Terminal apparatus 900 differs from the terminal apparatus shown in FIG. 10 and explained in Embodiment 4 in having subcarrier demapper 910 instead of P/S section 520.

Control information extractor 230 restores control information by applying demodulation and decoding processing to the portion corresponding to the control signal in the output signals of the frequency domain equalizer. The control information to be restored includes information related to the mapping target subcarriers determined in subcarrier mapping determiner 620 of base station apparatus 600.

Subcarrier demapper 910 extracts only the signals matching the mapping target subcarriers in the N1 parallel signals outputted from subcarrier demapper 510, based on information related to the mapping target subcarriers and received from control information extractor 230, and outputs these signals as serial signals to transmission power offset compensator 330.

Here, information related to the mapping target subcarriers is transmitted per unit measurement time. An OFDMA symbol, a period which is formed with a plurality of OFDMA symbols and in which SCM is performed per user, or a frame, may be used for this unit measurement time. This information needs to be recognized by terminal apparatus 900.

Accordingly, the information as to which period is used for a unit measurement time is included in the control signal and reported to terminal apparatus 900 from base station apparatus 600. Particularly, if a period formed with a plurality of OFDMA symbols in which SCM is performed per user is used, this period is reported together with frequency resource allocation information.

According to the above configuration, even when mapping target subcarriers are changed every unit measurement time, terminal apparatus 900 can receive a second modulated signal addressed to terminal apparatus 900.

Embodiment 2

The present embodiment relates to another configuration of the base station apparatus. That is, in base station apparatus 600 explained in Embodiment 5, subcarrier mapping determiner 620 determines subcarriers to map an output modulated signal of modulator 115 on the outputs of DFT section 120, based on the outputs of DFT output power measurer 610. By contrast with this, the DFT output power measurer is not provided in the base station apparatus according to the present embodiment.

Figure 16:
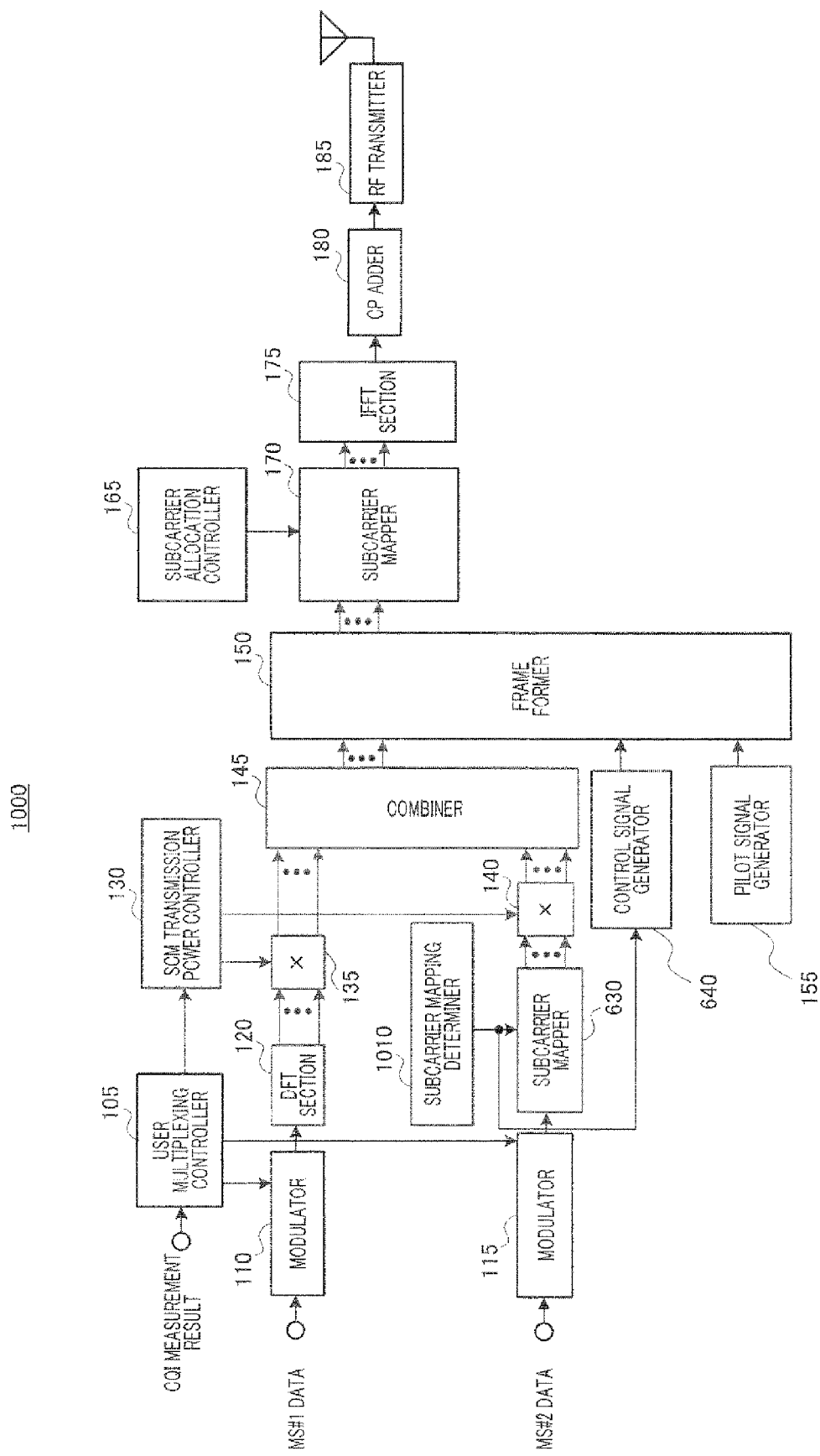
FIG. 16 is a block diagram showing a main configuration of a base station apparatus according to Embodiment 9.

FIG. 16 is a block diagram showing a configuration of base station apparatus 1000 that is a multicarrier transmitting apparatus according to Embodiment 9.

In base station apparatus 1000, subcarrier mapping determiner 1010 outputs information related to mapping target subcarriers to subcarrier mapper 630.

Figure 17:
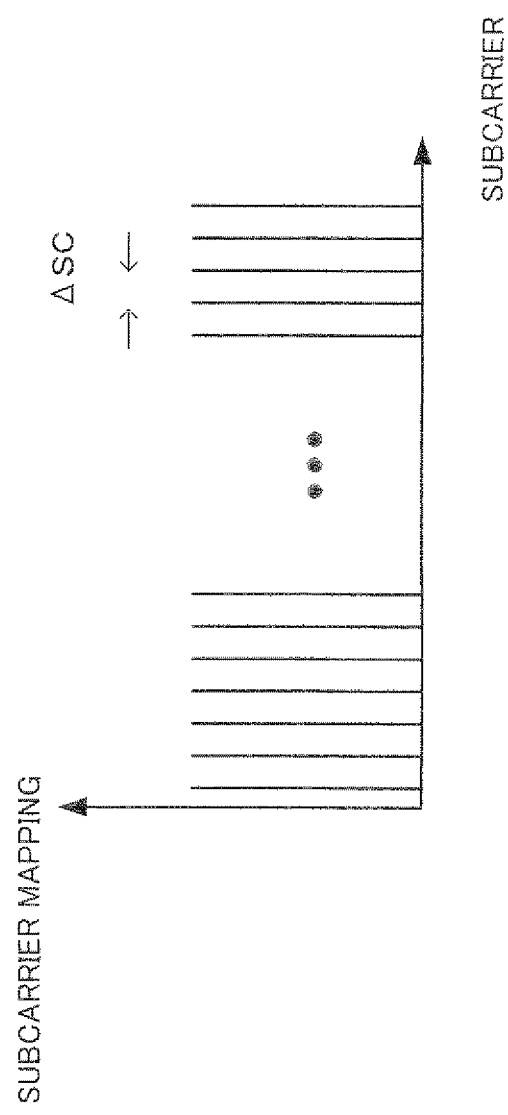
FIG. 17 illustrates operations of a subcarrier mapping determiner and subcarrier mapper.

Here, as shown in FIG. 17, a subcarrier group formed with subcarriers a predetermined subcarrier interval (ΔSC) spaced apart from each other is used for the mapping target subcarriers. That is, the mapping target subcarriers are provided in a distributed allocation. To be more specific, assuming ΔSC=N1/N2, the mapping target subcarriers are distributed uniformly.

According to the above configuration, the output subcarriers of DFT section 120 upon which the modulated signal of modulator 115 is superimposed can be distributed, so that it is possible to improve transmission SINR on average in transmission signals transmitted through modulator 110. This advantage becomes significant when N1 is substantially greater than N2 (in case of N1>>N2).

Further, the mapping target subcarriers are provided in a distributed allocation such that they are spaced apart from each other by a predetermined subcarrier interval (ΔSC), which is the function of N1 and N2. That is, subcarriers are mapped in association with information about N1 and N2. Accordingly, if terminal apparatuses of the receiving side know the values of N1 and N2 in advance, base station apparatus 100 does not need to report control information.

By this means, it is possible to provide an advantage of reducing an overhead upon data transmission. Further, accompanying this, in a terminal apparatus, control information extractor 230 does not need to perform the operation of extracting information related to mapping target subcarriers, so that the processing load on the receiving side is reduced.

As described above, according to the present embodiment, base station apparatus 1000 has: DFT section 120 that forms N1 subcarrier signals by dividing a first modulated signal in the frequency domain on a per symbol basis; subcarrier mapper 630 that is configured to output N1 parallel signals matching N1 subcarrier signals on a one-by-one basis, forms N2 parallel signals where N1 is smaller than N2, by performing serial-to-parallel conversion of a second modulated signal and outputs the N2 parallel signals as parallel signals matching the mapping target subcarriers; and subcarrier mapping determiner 1010 that selects as the mapping target subcarriers a subcarrier group formed with subcarriers that are a predetermined subcarrier interval apart from each other.

By so doing, it is possible to distribute output subcarriers of DFT section 120 upon which a second modulated signal is superimposed, and, consequently, improve transmission SINR related to the second modulated signal on average.

Embodiment 10

A case will be explained with the present embodiment where a base station apparatus is configured to perform directional transmission.

The base station apparatus according to the present embodiment has a plurality of transmitting antennas. The base station apparatus has several directivity beam patterns, and transmits a pilot signal using each directivity beam pattern.

The terminal apparatuses that are present in a cell covered by the base station apparatus each select an optimal directivity beam pattern based on the pilot signal transmitted from the base station apparatus, and report the selected pattern to the base station apparatus.

Further, there is following another method for the method of selecting an optimal directivity beam pattern. That is, the base station apparatus transmits the pilot signal in units of antenna elements provided in the base station apparatus. At this time, the base station apparatus multiplexes and transmits the pilot signal using FDM, TDM or CDM, such that terminal apparatuses can separate and receive the pilot signal.

The terminal apparatuses each receive the pilot signal and calculate a channel estimation value. The terminal apparatus reports to the base station apparatus an optimal directivity beam pattern that maximizes received SNR, from directivity beam pattern candidates which form transmission directivity and which are known in advance.

Then, the base station apparatus groups terminal apparatuses according to the selected pattern reported from terminal apparatuses. That is, the base station apparatus groups terminal apparatuses according to the direction in which terminal apparatuses are present.

Figure 18:
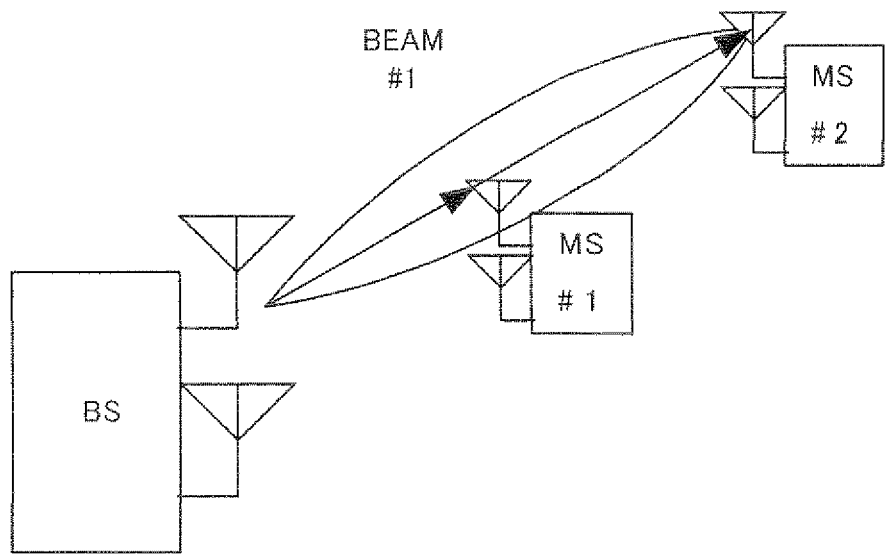
FIG. 18 illustrates a transmitting method of a base station apparatus according to Embodiment 10.

Further, the base station apparatus selects from terminal apparatuses belonging to the same group, a combination of a terminal apparatus that is located far from the base station apparatus and a terminal apparatus located close to the base station apparatus. Like MS #1 (i.e. terminal apparatus) and MS #2 shown in FIG. 18, terminal apparatuses that are located far from and close to the base station apparatus and that belong to the same group are selected.

Then, the base station apparatus combines modulated signals addressed to two terminal apparatuses of that combination according to the method described in above Embodiment 1 and Embodiment 3, and performs directional transmission of the combined signal. That is, the combined signal is transmitted using one directivity beam.

Embodiment 11

A case will be explained with the present embodiment where a base station apparatus (BS) is configured to support space division multiple access (SDMA). "Space division multiple access" is an access mechanism to allow a plurality of terminal apparatuses to perform communication using the same frequency band at the same time by means of functions of transmitting-receivers that transmit and receive signals using physical separation of terminal apparatuses in space and directivity beams.

Similar to the base station apparatus of Embodiment 5, the base station apparatus according to the present embodiment groups terminal apparatuses and selects a combination of two of a distant terminal apparatus and a neighboring terminal apparatus of terminal apparatuses belonging to the same group. Further, the base station apparatus according to the present embodiment combines modulated signals addressed to these two terminal apparatuses of that combination according to the method described in above Embodiment 1 or Embodiment 3, and performs directional transmission of a combined signal. That is, the combined signal is transmitted using one directivity beam.

Further, the base station apparatus of the present embodiment performs spatially division multiplexing of signals addressed to terminal apparatuses that selected different directivity beam patterns.

Figure 19:
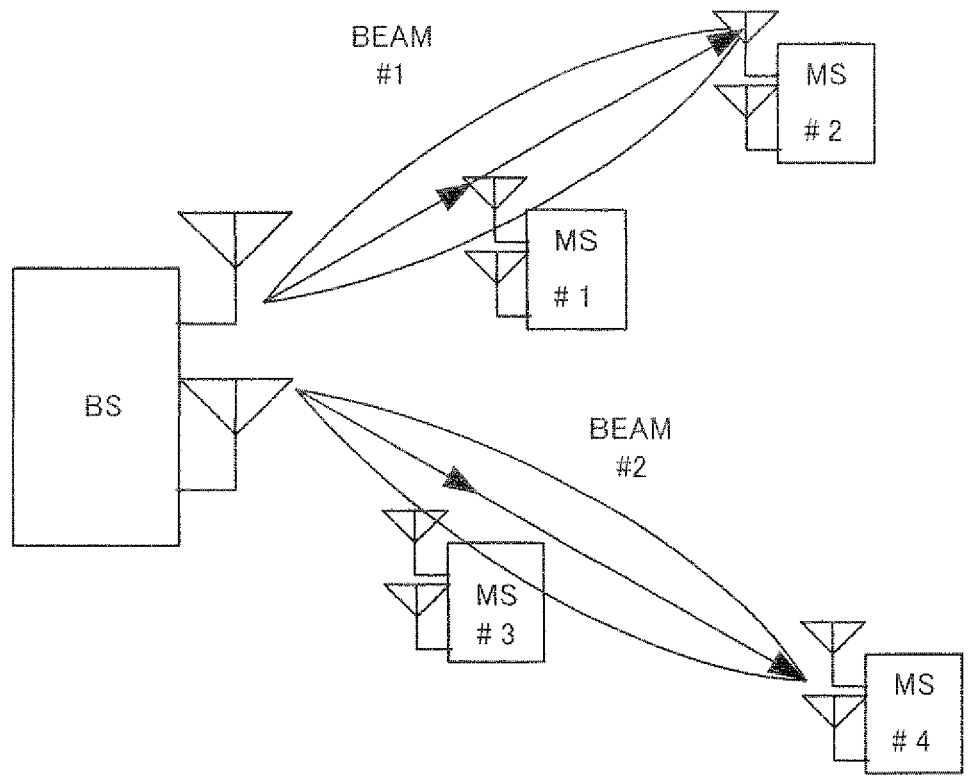
FIG. 19 illustrates a transmitting method of a base station apparatus according to Embodiment 11.

That is, as shown in FIG. 19, the base station apparatus transmits a combined signal using directivity beam #1 to the combination of terminal apparatus #1 and terminal apparatus #2, and transmits a combined signal using directivity beam #2 to the combination of terminal apparatus #3 and terminal apparatus #4.

In terminal apparatuses of a receiving side that receive the combined signal, there are cases where a beam used to transmit the combined signal to this terminal apparatus is influenced by interference from other beams. Therefore, the terminal apparatuses perform interference cancellation processing of canceling other beams that are not the target for the terminal apparatuses to receive, in space using a plurality of antennas provided in the terminal apparatuses.

The base station apparatus transmits a pilot signal in which interference can be canceled in space, in order to allow the receiving side to perform this interference cancellation processing. There are the following two methods for this transmitting method.

With the first method, the base station apparatus transmits a pilot signal in units of antenna elements provided in the base station apparatus. At this time, the base station apparatus multiplexes and transmits the pilot signal using FDM, TDM or CDM, so that terminal apparatuses can each separate and receive this pilot signal. Further, at the same time, the base station apparatus reports weight information used to form a plurality of beams.

With the second method, the base station apparatus transmits pilot signals that can be separated between directivity beams.

As described above, the base station apparatus (BS) utilizes space division multiplex access (SDMA), so that it is possible to perform multiplexing for a number of users beyond the number of antennas provided in the base station apparatus and further improve average throughput in downlink.

Embodiment 12

The present embodiment relates to uplink communication. The wireless communication system according to the present embodiment has: first terminal apparatus 1100 (see MS #1 of FIG. 20) that transmits dedicated data using the above first modulated signal; second terminal apparatus 1200 (see MS #2 of FIG. 21) that transmits dedicated data using the above a second modulated signal of the same frequency and time resources as in terminal apparatus 1100; and base station apparatus 1300 (see FIG. 22) that receives a spatially-multiplexed signal in which a signal transmitted from terminal apparatus 1100 and a signal transmitted from terminal apparatus 1200 are spatially multiplexed.

Figure 20:
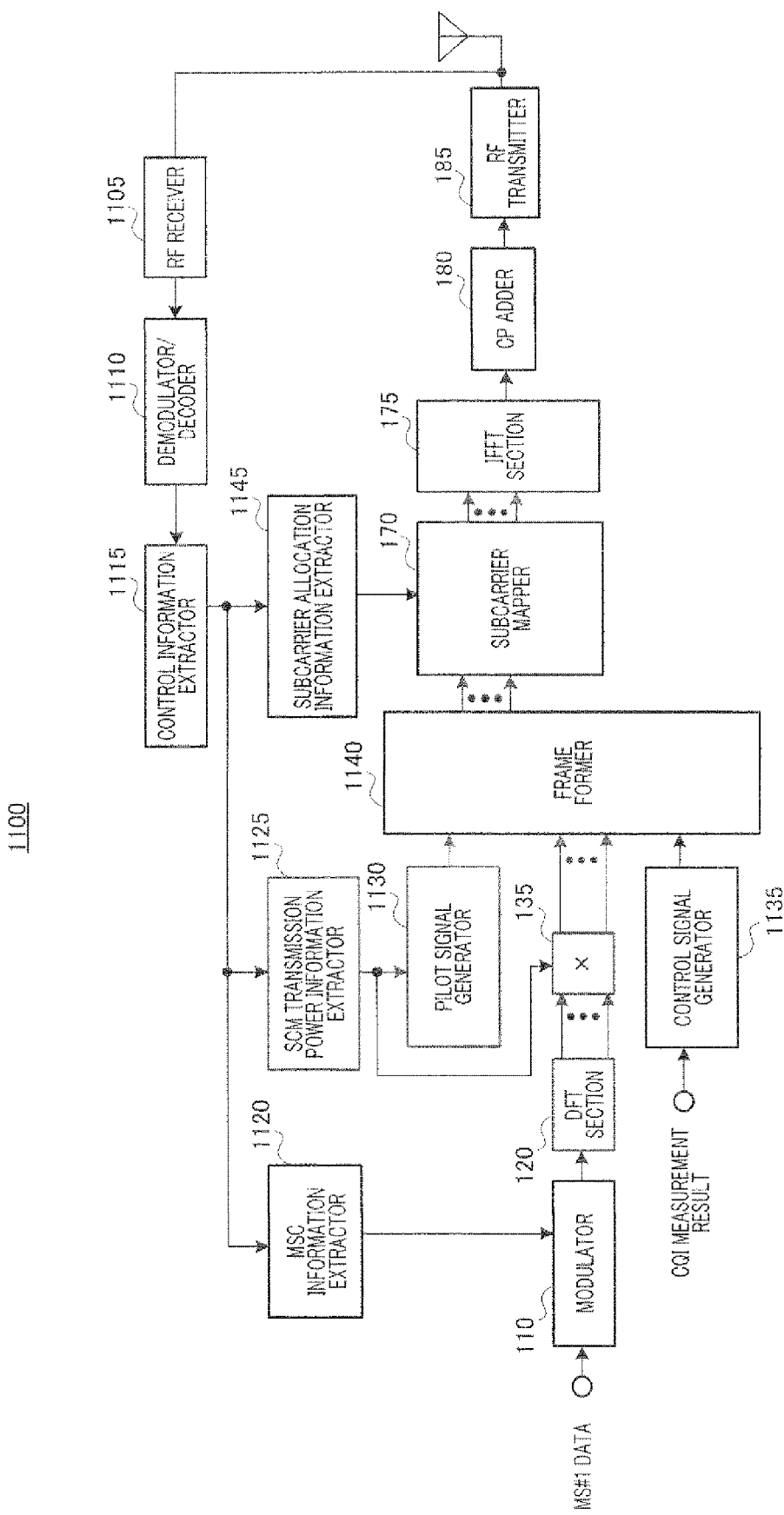
FIG. 20 is a block diagram showing a main configuration of a first terminal apparatus according to Embodiment 12.
Figure 21:
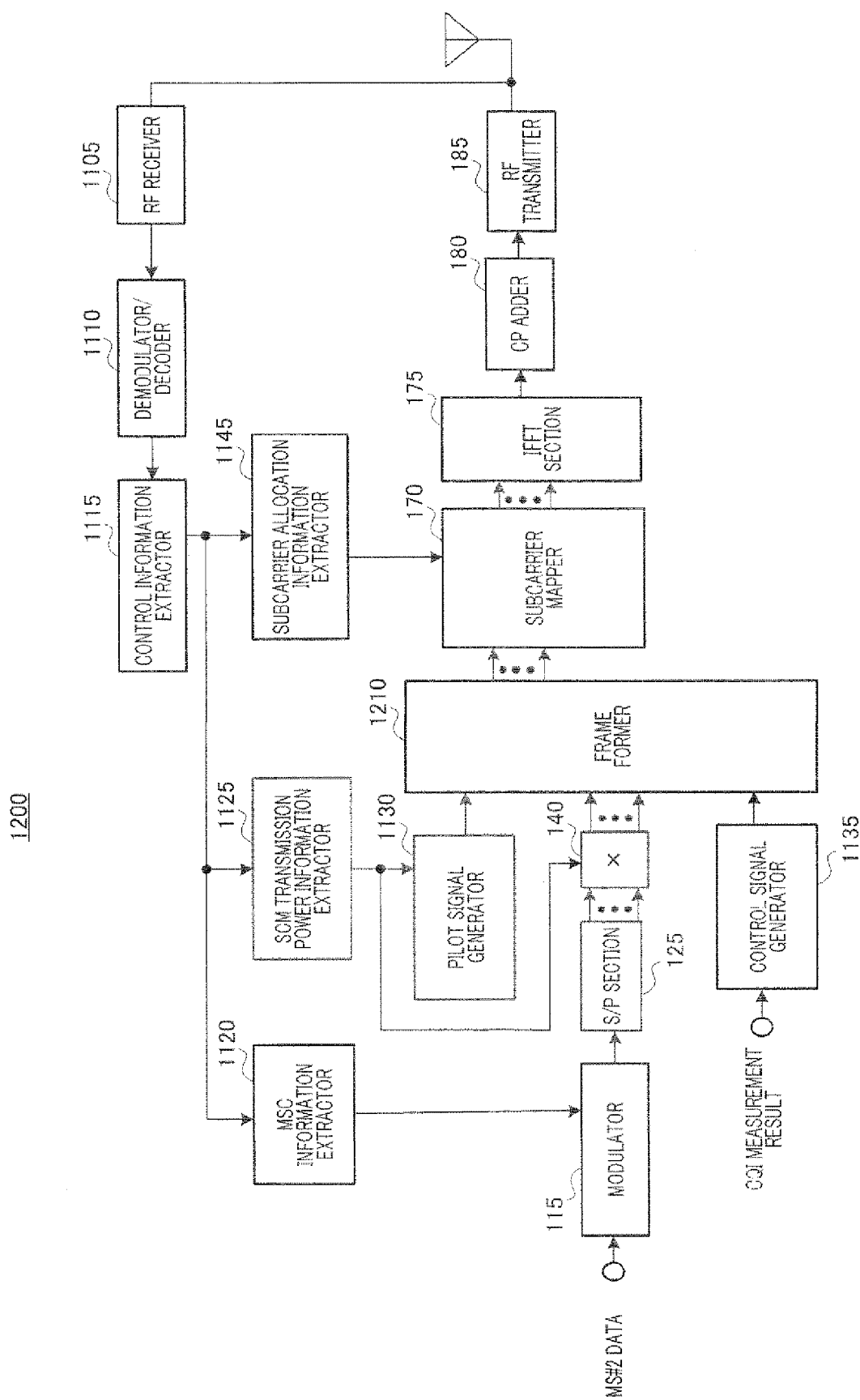
FIG. 21 is a block diagram showing a main configuration of a second terminal apparatus according to Embodiment 12.

FIG. 20 and FIG. 21 show configurations of terminal apparatus 1100 and terminal apparatus 1200 in case where OFDMA is applied. Further, a case will be explained below where SCM transmission is performed using N1 subcarriers. Here, in case where N_FFT is assumed to be the FFT size in the IFFT (Inverse Fast Fourier Transform) section, the relationship N1≥N_FFT holds.

FIG. 20 is a block diagram showing a configuration of first terminal apparatus 1100 according to the present embodiment.

In FIG. 20, terminal apparatus 1100 has RF receiver 1105, demodulator/decoder 1110, control information extractor 1115, MCS information extractor 1120, SCM transmission power information extractor 1125, pilot signal generator 1130, control signal generator 1135 and frame former 1140.

RF receiver 1105 acquires a baseband signal by performing frequency transformation of a received signal that is transmitted from base station apparatus 1300 and received at an antenna.

Demodulator/decoder 1110 demodulates and decodes the control signal and data signal included in the baseband signal acquired in RF receiver 1105.

Control information extractor 1115 extracts control information included in the control signal received from demodulator/decoder 1110.

MCS information extractor 1120 extracts MCS information included in the control information extracted in control information extractor 1115. The M-ary modulation value determined from this MCS information is used in modulation processing in modulator 110.

SCM transmission power information extractor 1125 extracts SCM transmission power included in the control information extracted in control information extractor 1115. SCM transmission power information extractor 1125 finds power control coefficients α and β used to control the transmission power of output signals of DFT section 120, based on the SCM transmission power information, and outputs the transmission power coefficients to multiplier 135 and pilot signal generator 1130.

Pilot signal generator 1130 generates a pilot signal, and outputs the pilot signal to frame former 1140. The power value of this pilot signal is controlled by transmission power coefficients α and β.

Control signal generator 1135 receives as input a CQI measurement result, and generates control information including this CQI measurement result.

Subcarrier allocation information extractor 1145 extracts subcarrier allocation information included in the control information extracted in control information extractor 1115. This subcarrier allocation information is outputted to subcarrier mapper 170.

Modulator 110, DFT section 120 and multiplier 135 have the same functions as in the components provided in base station 100 of Embodiment 1.

Frame former 1140 receives as input the signals outputted from multiplier 135, the pilot signal outputted from pilot signal generator 1130 and the control signal outputted from control signal generator 1135. Then, frame former 1140 forms a frame using the output signals of multiplier 135, the pilot signal and control signal. In this frame, for example, the output signals of multiplier 135, pilot signal and control signal are each arranged in different time intervals. That is, the output signals of multiplier 135, pilot signal and control signal are transmitted according to TDD.

Here, terminal apparatus 1100 multiplexes and transmits a pilot signal according to FDM, TDM, CDM or the combination of them, to allow base station apparatus 1300 to separate the signal from a pilot signal transmitted from terminal apparatus 1200. Assume that transmission power of the pilot signal is the same as the transmission power of outputs of multiplier 135.

Note that, as another method, it is equally possible to transmit the pilot signal by using a predetermined amount of offset and increasing transmission power (that is, it is possible to use a pilot signal boost scheme). In this case, transmission power of the pilot signal can be increased, so that it is possible to improve the accuracy of channel estimation on the receiving side and improve receiving performance.

FIG. 21 is a block diagram showing a configuration of first second terminal apparatus 1200 according to the present embodiment. In FIG. 21, terminal apparatus 1200 has frame former 1210.

Frame former 1210 receives as input the signals outputted from multiplier 140, the pilot signal outputted from pilot signal generator 1130 and the control signal outputted from control signal generator 1135. Then, frame former 1210 forms a frame using the output signals of multiplier 140, the pilot signal and control signal.

In this frame, for example, the output signals of multiplier 140, pilot signal and control signal are each arranged in different time intervals. That is, the output signals of multiplier 140, pilot signal and control signal are transmitted according to TDD.

Here, terminal apparatus 1200 multiplexes and transmits a pilot signal according to FDM, TDM, CDM or the combination of them, to allow base station apparatus 1300 to separate the signal from a pilot signal transmitted from terminal apparatus 1100. Assume that transmission power of the pilot signal is the same as the transmission power of the outputs of multiplier 140.

Note that, as another method, it is equally possible to transmit the pilot signal by using a predetermined amount of offset and increasing transmission power (that is, it is possible to use a pilot signal boost scheme). In this case, transmission power of the pilot signal can be increased, so that it is possible to improve the accuracy of channel estimation on the receiving side and improve receiving performance.

Note that modulator 115, S/P section 125 and multiplier 140 have the same functions as in the components provided in base station apparatus 100 of Embodiment 1.

Embodiment 13

Figure 22:
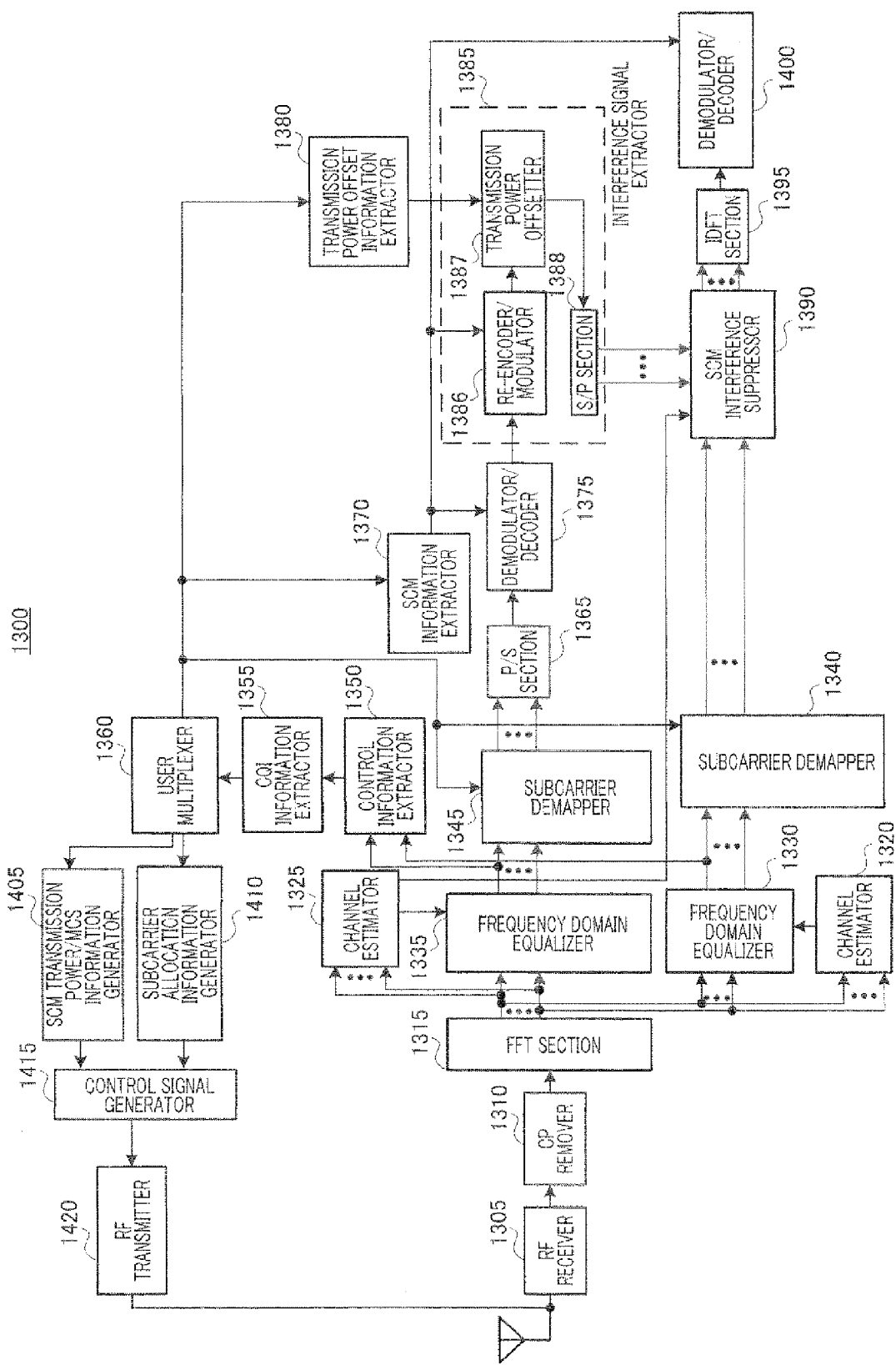
FIG. 22 is a block diagram showing a main configuration of a base station apparatus according to Embodiment 13.

FIG. 22 is a block diagram showing a configuration of base station apparatus 1300 according to the present embodiment.

In FIG. 22, base station apparatus 1300 has RF receiver 1305, CP remover 1310, FFT section 1315, channel estimators 1320 and 1325, frequency domain equalizers 1330 and 1335, subcarrier demappers 1340 and 1345, control information extractor 1350, CQI information extractor 1355, user multiplexing controller 1360, P/S section 1365, SCM information extractor 1370, demodulator/decoder 1375, transmission power offset information extractor 1380, interference signal extractor 1385, SCM interference suppressor 1390, IDFT section 1395, demodulator/decoder 1400, SCM transmission power/MCS information generator 1405, subcarrier allocation information generator 1410, control signal generator 1415 and RF transmitter 1420.

Among these components, mainly, channel estimator 1320, frequency domain equalizer 1330, subcarrier demapper 1340, SCM interference suppressor 1390, IDFT section 1395 and demodulator/decoder 1400 relate to reception processing of signals transmitted from terminal apparatus 1100.

By contrast with this, mainly, channel estimator 1325, frequency domain equalizer 1335, subcarrier demapper 1340, P/S section 1365 and demodulator/decoder 1375 relate to reception processing of signals transmitted from terminal apparatus 1200.

The signals transmitted from terminal apparatus 1100 and terminal apparatus 1200 are subjected to predetermined radio reception processing in RF receiver 1305, and the CPs are removed in CP remover 1310. Then, the received OFDM signals after CP removal are transformed into frequency domain signals in FFT section 1315.

Channel estimator 1320 calculates a channel estimation value using the pilot signal transmitted from terminal apparatus 1100 and included in the output signals of FFT section 215. By contrast with this, channel estimator 1325 calculates a channel estimation value using the pilot signal transmitted from terminal apparatus 1200 and included in the output signals of FFT section 1315. Channel estimator 1320 and channel estimator 1325 each calculate a channel estimation value per subcarrier.

Frequency domain equalizer 1330 performs frequency domain equalization of subcarrier signals outputted from FFT section 1315 using the channel estimation value calculated in channel estimator 1320. By contrast with this, frequency domain equalizer 1335 performs frequency domain equalization of subcarrier signals outputted from FFT section 1315 using the channel estimation value calculated in channel estimator 1325.

The ZF criterion or MMSE criterion is used in this frequency domain equalization. The subcarrier signals subjected to frequency domain equalization processing are outputted to control information extractor 1350, subcarrier demapper 1340 and subcarrier demapper 1345.

Control information extractor 1350 restores control information by applying demodulation and decoding processing to the portion corresponding to the control signal in the output signals of frequency domain equalizer 1330 and frequency domain equalizer 1335. This control signal is processed according to a modulation scheme and encoding scheme that are known in advance in terminal apparatus 1100 and terminal apparatus 1200 of the transmitting side, and is transmitted.

CQI information extractor 1355 extracts CQIs (Channel Quality Information) each transmitted from terminal apparatus 1100 and terminal apparatus 1200, from the control information acquired in control information extractor 1350. This CQI (Channel Quality Information) is a measurement result related to the channel quality of the channel between base station apparatus 1300 and terminal apparatus 1100 (or terminal apparatus 1200).

User multiplexing controller 1360 determines frequency resources (that is, subcarriers) allocated to terminal apparatus 1100 and terminal apparatus 1200.

Further, user multiplexing controller 1360 determines M-ary modulation values used in terminal apparatus 1100 and terminal apparatus 1200, and outputs the determined M-ary modulation values to SCM transmission power/MCS information generator 1405. When channel quality indicated by CQI is better, user multiplexing controller 1360 increases the order of the M-ary modulation value.

Although the measurement result of channel quality used to determine these M-ary modulation values may be results that are measured by terminal apparatus 1100 and terminal apparatus 1200 based on the signal transmitted from base station apparatus 1300 and that are fed back to base station apparatus 1300, a result that is measured by base station apparatus 1300 based on transmission signals from terminal apparatus 1100 and terminal apparatus 1200 may be used for another method.

Further, user multiplexing controller 1360 adds power control that is generally practiced based on MCS that is set, in order to satisfy target received quality (determined according to the block error rate and packet error rate), and additionally limits the transmission power offset range between power control coefficients α and β to suppress the influence of quantization error upon the receiving performance of the distant user. To be more specific, power control coefficients α and β are determined to satisfy the following condition.

Identifiable condition of SCM: $\alpha/\beta > 1/2$

Condition in which no influence of quantization error is produced:

$D > (\alpha/(\alpha+\beta))$

D=around 6 to 12 dB

Further, user multiplexing controller 1360 allocates subcarriers that are used to transmit the data signals by terminal apparatus 1100 and terminal apparatus 1200. For the method of allocating subcarriers, as shown in FIG. 5, a (localized allocation) method of allocating consecutive subcarriers or a (distributed allocation) method of using subcarriers of equal intervals is used.

SCM information extractor 1370 receives information related to the M-ary modulation values determined in user multiplexing controller 1360.

Transmission power offset information extractor 1380 receives transmission power offset information (information related to the transmission power ratios of a data signal of terminal apparatus 1100, a data signal of terminal apparatus 1200 and a pilot signal) from user multiplexing controller 1360, and outputs the transmission power offset information to interference signal extractor 1385.

Subcarrier demapper 1340 extracts a subcarrier group allocated to terminal apparatus 1100, based on the frequency resource allocation information determined in user multiplexing controller 1360, and outputs the subcarrier group to SCM interference suppressor 1390. By contrast with this, subcarrier demapper 1345 extracts the subcarrier group allocated to terminal apparatus 1200, based on the frequency resource allocation information determined in user multiplexing controller 1360, and outputs the subcarrier group to P/S section 1365.

The signal of terminal apparatus 1200 is transmitted using N1 parallel signals, and therefore P/S section 1365 converts frequency subcarrier signals inputted as the parallel signals, into a serial signal.

Demodulator/decoder 1375 demodulates and decodes the signal received from P/S section 1365, based on information that relates to the M-ary modulation value used in terminal apparatus 1200 and that is received from SCM information extractor 1370. By this means, it is possible to acquire a data signal transmitted from terminal apparatus 1200.

Interference signal extractor 1385 generates a replica signal that is used to cancel signal components of terminal apparatus 1200 and that is an interference signal for a transmission signal of terminal apparatus 1100, from the output signals for subcarrier demapper 1340. The output signals of subcarrier demapper 1340 include interference components upon which the modulated signal of terminal apparatus 1100 is superimposed as is as a time domain signal, which deteriorates the receiving performance of signals transmitted from terminal apparatus 1200, so that it is possible to provide an advantage of improving receiving performance by canceling the interference signal in advance.

To be more specific, interference signal extractor 1385 has re-encoder/modulator 1385, transmission power offsetter 1387 and S/P section 1388.

Re-encoder/modulator 1386 generates a transmission replica signal of terminal apparatus 1200 by performing the same processing as encoding and modulation processing performed in terminal apparatus 1200, with respect to a decoding result acquired in demodulator/decoder 1375, based on information that relates to the M-ary modulation value used in terminal apparatus 1200 and that is received from SCM information extractor 1370.

Transmission power offsetter 1387 adjusts the power difference (i.e. offset) between the transmission power of terminal apparatus 1200 and the transmission power of terminal apparatus 1100. If there is a ratio of a transmission amplitude (L1=β/α) of a transmission signal of terminal apparatus 1200, with respect to the transmission signal from terminal apparatus 1100, the transmission power offset compensator outputs the signal acquired by multiplying the input signal with L1.

S/P section 1388 converts the output of transmission power offsetter 1387, which is serial data, into parallel signals on a per subcarrier basis. Here, N1 parallel subcarrier signals are outputted.

SCM interference suppressor 1390 performs processing of subtracting replica signal Rep_D2(k) of each subcarrier of terminal apparatus 1200 re-generated in interference signal extractor 1385, from N1 parallel signals D1(k) which are outputs of subcarrier demapper 1340, using following equation 1 taking channel fluctuation into account. Here, Hj(k) and H2(k) each represent a channel estimation value of the k-th subcarrier acquired in j-th channel estimator 1325. Here, j is 1 or 2. k is a subcarrier number. k adopts a natural number from 1 to N1.

$$D1\_RD(k)=D1(k)-H2(k)Rep\_D2(k)/H1(k) \quad \text{(Equation 1)}$$

In this way, signal components from terminal apparatus 1200 can be canceled, so that it is possible to improve the receiving performance for signals from terminal apparatus 1100.

IDFT section 1395 performs transformation from the frequency domain into the time domain by performing IDFT processing of the outputs from the SCM interference suppressor based on the size of N1.

Demodulator/decoder 1400 demodulates/decodes signals received from IDFT section 1395, based on information that relates to the M-ary modulation value used in terminal apparatus 1100 and that is received from SCM information extractor 1370. By this means, it is possible to acquire data signals transmitted from terminal apparatus 1100.

SCM transmission power/MCS information generator 1405 generates control information based on the information related to the M-ary modulation value from user multiplexing controller 1360, according to a known format for reporting the control information to terminal apparatus 1100 and terminal apparatus 1200. SCM transmission power/MCS information generator 1405 further generates control information based on power control coefficients α and β determined in user multiplexing controller 1360, according to the format for reporting the control information to terminal apparatus 1100 and terminal apparatus 1200.

Here, SCM transmission power/MCS information generator 1405 prepares a plurality of sets (α and β) determined in advance in user multiplexing controller 1360 and makes a table of sets of (α and β) by assigning an index to each set to report index information matching a set of determined power control coefficients, to terminal apparatus 1100 and terminal apparatus 1200. By this means, it is possible to reduce the amount of signaling.

Subcarrier allocation information generator 1410 generates control information according to a known format for reporting the frequency resource information determined in user multiplexing controller 1360 to terminal apparatus 1100 and terminal apparatus 1200.

Control signal generator 1415 generates a control signal based on the control information generated in SCM transmission power/MCS information generator 1405 and subcarrier allocation information generator 1410, and transmits the control signal to terminal apparatus 1100 and terminal apparatus 1200 through RF transmitter 1420.

As described above, according to Embodiments 12 and 13, terminal apparatus 1100 has: DFT section 120 that forms a plurality of discrete frequency domain components by dividing a first modulated signal in the frequency domain on a per symbol basis; subcarrier mapper 170 that forms a transmission multicarrier signal by mapping a plurality of discrete frequency domain components on a first subcarrier group; and RF transmitter 185 that transmits the transmission multicarrier signal to base station apparatus 1300.

Further, terminal apparatus 1200 has: S/P section 125 that forms a plurality of parallel signals by performing serial-to-parallel conversion of a second modulated signal; subcarrier mapper 170 that forms a second transmission multicarrier signal by mapping a plurality of parallel signals on the second subcarrier group that overlaps the frequency band of the first subcarrier group; and RF transmitter 185 that transmits the second multicarrier signal to base station apparatus 1300. Furthermore, terminal apparatus 1100 and terminal apparatus 1200 use the same time resources.

By so doing, a spatially-multiplexed signal received in base station apparatus 1300 becomes similar to the received signal of the terminal apparatus in Embodiment 2 or 4. That is, in this spatially-multiplexed signal, a second modulated signal that is an interference signal for terminal apparatus 1100 and that is transmitted from terminal apparatus 1200 is superimposed as is as a time domain signal upon frequency components into which the first modulated signal transmitted from terminal apparatus 1100 is divided in the frequency domain on a per symbol basis.

Accordingly, by performing basically the same reception processing as reception processing in the terminal apparatus described in Embodiment 2 or 4, base station apparatus 1300 can separate the first modulated signal and a second modulated signal from the received spatially-multiplexed signal.

To be more specific, base station apparatus 1300 has: P/S section 1365 that acquires a serial signal sequence by performing parallel-to serial conversion of the received spatially-multiplexed signal; and demodulator/decoder 1375 that demodulates and decodes the serial signal sequence. According to this configuration, it is possible to restore the second modulated signal transmitted from terminal apparatus 1200.

Further, in the received spatially-multiplexed signal, the signal transmitted from terminal apparatus 1100 shows the state of white noise or the state of noise close to white noise. Therefore, the minimum inter-signal point distance of a signal transmitted from terminal apparatus 1200 increases on average. Accordingly, it is possible to perform reception processing of the transmission signal of terminal apparatus 1200 in a state in which the influence of the transmission signal from terminal apparatus 1110 is suppressed low, and, consequently, improve the error rate of received data.

Further, base station apparatus 1300 has interference signal extractor 1385 that forms a replica signal of the second modulated signal from the decoding result in demodulator/decoder 1375.

Furthermore, base station apparatus 1300 has: SCM interference suppressor 1390 that subtracts the replica signal formed in interference signal extractor 1385, from the received spatially-multiplexed signal; IDFT section 1395 that performs an inverse Fourier transform of the signals acquired in SCM interference suppressor 1390; and demodulator/decoder 1400 that demodulates and decodes the signal sequences acquired in IDFT section 1395.

By so doing, it is possible to accurately restore the first modulated signal. That is, SCM interference suppressor 1390 can perform processing of canceling an interference signal of terminal apparatus 1200 included in the signal from terminal apparatus 1100 using received data of the improved error rate of terminal apparatus 1200, so that it is possible to reduce the error rate of the transmission signal from terminal apparatus 1100.

Further, with the present embodiment, the number of frequency components acquired from the modulated signal in terminal apparatus 1100 is made to match with the number of parallel signals acquired from the modulated signal in terminal apparatus 1200. However, the number of frequency components and the number of parallel signals need not to be the same.

That is, the above advantage is acquired as long as, in the spatially-multiplexed signal received in base station apparatus 1300, the modulated signal in terminal apparatus 1200 is superimposed as is as a time domain signal upon at least part of a plurality of frequency components into which the modulated signal in terminal apparatus 1100 is divided in the frequency domain on a per symbol basis.

Further, terminal apparatus 1100 and base station apparatus 1300 may perform processing using an orthogonal transformation matrix having unitarity instead of performing processing in the IDFT section and DFT section. In this case, it is also possible to acquire the same advantage as described above.

The disclosures of Japanese Patent Application No. 2007-364828, filed on Oct. 10, 2007, and Japanese Patent Application No. 2008-261969, filed on Oct. 8, 2008, including the specifications, drawings and abstracts, are incorporated herein by reference in their entirety.

INDUSTRIAL APPLICABILITY

The multicarrier transmitting apparatus and multicarrier receiving apparatus according to the present invention are useful to improve the receiving performance in hierarchical modulation multiplexing communication.

The invention claimed is:
1. A multicarrier signal transmitting apparatus comprising:
a first modulator that forms a first modulated signal;
a second modulator that forms a second modulated signal;
a transmission power controller that sets transmission power of the first modulated signal and the second modulated signal;
a Fourier transformer that forms a plurality of discrete frequency components by dividing the first modulated signal in frequency domain on a per symbol basis;
a serial-to-parallel converter that forms a plurality of parallel signals by performing serial-to-parallel conversion of the second modulated signal; and
a modulated signal combiner that forms a multicarrier signal in which the plurality of parallel signals in time domain are combined with the plurality of discrete frequency components in the frequency domain formed by the Fourier transformer, wherein:

the modulated signal combiner performs a weighted addition of the plurality of discrete frequency components and the plurality of parallel signals, based on the set transmission power, and the transmission power controller sets a transmission power coefficient for the first modulated signal greater than a transmission power coefficient for the second modulated signal.

2. The multicarrier transmitting apparatus according to claim 1, wherein an M-ary modulation value varies between the first modulated signal and the second modulated signal.

3. The multicarrier transmitting apparatus according to claim 1, wherein the first modulator and the second modulator form the first modulated signal and the second modulated signal respectively by making an M-ary modulation value for the first modulated signal smaller than an M-ary modulation value for the second modulated signal.

4. A multicarrier transmitting apparatus comprising:
a first modulator that forms a first modulated signal;
a second modulator that forms a second modulated signal;
a transmission power controller that sets transmission power of the first modulated signal and the second modulated signal;
a Fourier transformer that forms a plurality of discrete frequency components by diving the first modulated signal in frequency domain on a per symbol basis;

a serial-to-parallel converter that forms a plurality of parallel signals by performing serial-to-parallel conversion of the second modulated signal; and a modulated signal combiner that forms a multicarrier signal in which the plurality of parallel signals in time domain are combined with the plurality of discrete frequency components in the frequency domain formed by the Fourier transformer, wherein:

the modulated signal combiner performs weighted addition of the plurality of discrete frequency components and the plurality of parallel signals, based on the set transmission power, and the transmission power controller sets a transmission power coefficient for the first modulated signal smaller than a transmission power coefficient for the second modulated signal.

5. The multicarrier transmitting apparatus according to claim 4, wherein an M-ary modulation value varies between the first modulated signal and the second modulated signal.

6. The multicarrier transmitting apparatus according to claim 4, wherein the first modulator and the second modulator form the first modulated signal and the second modulated signal respectively by making an M-ary modulation value for the first modulated signal greater than an M-ary modulation value for the second modulated signal.

* * * * *